(12) United States Patent
Higuchi et al.

(10) Patent No.: US 10,112,471 B2
(45) Date of Patent: Oct. 30, 2018

(54) BATTERY-DRIVEN TRAVELING DEVICE

(71) Applicant: Sharp Kabushiki Kaisha, Osaka (JP)

(72) Inventors: Atsushi Higuchi, Osaka (JP); Tetsushi Itoh, Osaka (JP); Kyosuke Taka, Osaka (JP); Yoshitaka Okahashi, Osaka (JP); Kosuke Tanaka, Osaka (JP); Kiyotaka Hirata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/596,386

(22) Filed: May 16, 2017

(65) Prior Publication Data
US 2017/0334279 A1    Nov. 23, 2017

(30) Foreign Application Priority Data

May 18, 2016  (JP) .................................. 2016-99676
Mar. 24, 2017  (JP) .................................. 2017-59876

(51) Int. Cl.
*B60K 1/04*         (2006.01)
*B60L 11/18*        (2006.01)
(Continued)

(52) U.S. Cl.
CPC .............. *B60K 1/04* (2013.01); *B60K 7/0007* (2013.01); *B60L 11/1822* (2013.01);
(Continued)

(58) Field of Classification Search
CPC  B60K 1/04; B60K 7/0007; B60K 2007/0061; B60K 2007/0046;
(Continued)

(56) References Cited

U.S. PATENT DOCUMENTS 5,301,765 A * 4/1994 Swanson .................. B60K 1/04
                                                    104/34
5,360,307 A * 11/1994 Schemm .................. B60K 1/04
                                                    104/34
(Continued)

FOREIGN PATENT DOCUMENTS

CN          203681241 U     7/2014
JP          09-095145 A     4/1997
(Continued)

*Primary Examiner* — Jacob B Meyer
(74) *Attorney, Agent, or Firm* — Renner, Otto, Boisselle & Sklar, LLP

(57) ABSTRACT

The present invention provides a battery-driven traveling device including: a framework section disposed on at least a bottom part of a vehicle body for ensuring strength of the vehicle body; two slide rails being composed of a left slide rail and a right slide rail and being supported by the framework section and extending substantially horizontally; a battery supporting member that is mounted to be insertable into the vehicle body and extractable from the vehicle body by using the two slide rails; and a plurality of dampers disposed on a path through which vibration of the vehicle body is transmitted from each of the slide rails to the battery supporting member for relaxing the vibration transmitted from the vehicle body to the battery while the device travels, wherein the left slide rail is disposed on left side of the battery supporting member and the right slide rail is disposed on right side of the battery supporting member, and each of the dampers is disposed above or below the left slide rail or the right slide rail.

12 Claims, 19 Drawing Sheets

(51) Int. Cl.
*B60K 7/00* (2006.01)
*B60K 17/04* (2006.01)

(52) U.S. Cl.
CPC ....... *B60L 11/1877* (2013.01); *B60L 11/1879* (2013.01); *B60K 17/043* (2013.01); *B60K 2001/0477* (2013.01); *B60K 2001/0494* (2013.01); *B60K 2007/0046* (2013.01); *B60K 2007/0061* (2013.01); *B60L 2270/145* (2013.01)

(58) Field of Classification Search
CPC .......... B60K 2001/0477; B60K 17/043; B60K 2001/0494; B60L 11/1822; B60L 11/1879
See application file for complete search history.

(56) References Cited

U.S. PATENT DOCUMENTS

| | | | | |
|---|---|---|---|---|
| 5,373,910 | A * | 12/1994 | Nixon | B60K 1/04 104/34 |
| 5,585,205 | A * | 12/1996 | Kohchi | B60K 1/04 180/65.1 |
| 7,070,015 | B2 * | 7/2006 | Mathews | B60K 1/04 180/274 |
| 7,270,208 | B2 * | 9/2007 | Huang | B60R 16/04 180/65.1 |
| 8,256,553 | B2 * | 9/2012 | De Paschoal | B60G 3/20 180/65.1 |
| 9,145,045 | B2 * | 9/2015 | Chang | H01M 2/1077 |
| 9,162,858 | B2 * | 10/2015 | Nishiyama | B66F 9/0754 |
| 9,461,284 | B2 * | 10/2016 | Power | B60L 11/1822 |
| 9,827,840 | B2 * | 11/2017 | Wen | B60K 1/04 |
| 2008/0006459 | A1 * | 1/2008 | Niebuhr | B60K 1/04 180/68.5 |
| 2008/0314662 | A1 * | 12/2008 | Bogelein | B60K 1/04 180/68.5 |
| 2011/0234070 | A1 * | 9/2011 | Kataoka | B61C 17/00 312/319.1 |
| 2012/0018235 | A1 * | 1/2012 | O'Quinn | B60K 1/04 180/65.1 |
| 2013/0104361 | A1 * | 5/2013 | Corfitsen | B60L 11/1822 29/402.08 |
| 2015/0037625 | A1 * | 2/2015 | Wen | B60K 1/04 429/50 |
| 2015/0114733 | A1 | 4/2015 | Chang | |
| 2017/0334279 | A1 * | 11/2017 | Higuchi | B60K 1/04 |

FOREIGN PATENT DOCUMENTS

| | | |
|---|---|---|
| JP | 2005-190800 A | 7/2005 |
| JP | 2011-168156 A | 9/2011 |

* cited by examiner

BATTERY-DRIVEN TRAVELING DEVICE

CROSS-REFERENCE TO RELATED APPLICATION

This application is related to Japanese Patent Application No. 2016-99676 which are filed on May 18, 2016 and No. 2017-59876 filed on Mar. 24, 2017, whose priorities are claimed and the disclosure of which are incorporated by reference in their entirety.

BACKGROUND OF THE INVENTION

1. Field of the Invention

The present invention relates to a battery-driven traveling device, and more particularly to a traveling device having the battery mounted to a vehicle body through a damper.

2. Description of the Related Art

As for a traveling device having a battery mounted thereon, there has been known a battery storage device having a tray for mounting a battery, the tray being mounted so as to be movable along a front-rear direction into a battery storage case which is slidably mounted under an underframe of a railway vehicle (see Japanese Unexamined Patent Publication No. 2011-168156, for example).

There has also been known a structure in which left and right longitudinal joists are fixed on a chassis frame of a vehicle along a front-rear direction, a battery box storage section is formed between the longitudinal joists and between the chassis frame and a cargo box, and a battery box storing a battery can be stored in the battery box storage section by a slide mechanism (see Japanese Unexamined Patent Publication No. H09-95145, for example).

There has also been known a light projection device that, for facilitating a work such as charging, maintenance, or replacement of a storage battery, allows an operator to carry out the work such as charging or maintenance by drawing the storage battery forward in a state in which the storage battery is placed on a side lid supported substantially horizontally by a support leg (see Japanese Unexamined Patent Publication No. 2005-190800, for example).

All of the configurations described above are provided with a battery drawing mechanism that does not need large power to facilitate a work such as maintenance or replacement.

In general, a battery which is used for a battery-driven traveling device accounts for a large portion of the weight of the device, and the center of gravity of the vehicle body greatly varies depending on a position where the battery is mounted. To implement stable travel, it is preferable that the battery is mounted on a position where a center of gravity position is low and there is no imbalance in a front-back direction and in a lateral direction.

In view of this, a location where the battery is to be mounted is preferably as close to a bottom part of the vehicle body as possible and near the center of the vehicle body in the lateral direction. The location where the battery is to be mounted is also preferably near the center of the vehicle body in the front-rear direction. However, there may be a case in which it is preferable that the battery is mounted close to a front part or close to a rear part in the light of the weight balance of the entire traveling device. In either case, the battery is preferably stored inside the vehicle body.

However, when the battery is mounted on the locations described above, an access to the battery for maintenance or replacement is not so easy. Therefore, as disclosed in the above-mentioned publications, a configuration has been proposed which is provided with a mechanism for sliding, by a slide mechanism, a battery from the location where the battery is mounted.

SUMMARY OF THE INVENTION

Meanwhile, a traveling device receives vibration on a vehicle body from a road surface while traveling. This vibration is transmitted to a battery, but it is not desirable from the viewpoint of safety and durability that strong vibration is applied to connection sections of electrodes and terminals of the battery. In view of this, it is considered that a damper is provided between the battery and the vehicle body.

In general, a damper is configured by a member or a mechanism deformed by vibration energy, such as a rubber material, a urethane elastomer, a metal spring, or an air spring, or a combination thereof. To absorb vibration, a space into which a damper with an appropriate size with a margin for deformation is required. On the other hand, a configuration of having a high center of gravity for providing a damper is not preferable from the viewpoint of travel stability. Further, it is not preferable that the vehicle body is increased in size for providing a damper.

The present invention is accomplished in view of the above circumstances, and provides a traveling device that includes a damper for effectively absorbing vibration with a low center of gravity in a limited size of a vehicle body.

A vehicle on which a person rides is provided with a suspension mechanism from the viewpoint of ride comfort and safety or uses a traveling pattern with a sharp turn or acceleration/deceleration being suppressed, and therefore, vibration of a vehicle-mounted battery is also suppressed. On the other hand, an unmanned vehicle places a significance on work efficiency or economic efficiency over ride comfort, and thus, it is considered that strong vibration is applied to a vehicle-mounted battery.

The present invention is accomplished in view of the above circumstance, and provides a traveling device that has a low center of gravity even if a battery is mounted so as to be drawable, and that can effectively absorb vehicle body vibration in various directions to relax vibration of the battery.

The present invention provides: a battery-driven traveling device including: a framework section disposed on at least a bottom part of a vehicle body for ensuring strength of the vehicle body; two slide rails on left and right supported by the framework section and extending substantially horizontally; a battery supporting member that is mounted to be insertable into the vehicle body and extractable from the vehicle body by using the two slide rails; and a plurality of dampers disposed on a path through which vibration of the vehicle body is transmitted from each of the slide rails to the battery supporting member for relaxing vibration transmitted from the vehicle body to the battery while the device travels, wherein the left slide rail is disposed on left side of the battery supporting member and the right slide rail is disposed on right side of the battery supporting member, and each of the dampers is disposed above or below the left slide rail or the right slide rail.

The traveling device according to the present invention is configured such that each of the slide rails is disposed on each left and right side of the battery supporting member, and each of the dampers is disposed above or below each of the left and right slide rails. According to this configuration, a damper mechanism has a compact structure integral with a battery drawing mechanism. Thus, a traveling device having a low center of gravity and relaxing vibration of the battery by effectively absorbing vibration from the vehicle body can be implemented.

DESCRIPTION OF THE PREFERRED EMBODIMENTS

Hereinafter, the present invention will be described in more detail with reference to the drawings. Note that the description below is illustrative in all aspects, and should not be construed to limit the present invention.

First Embodiment

<<Autonomous Vehicle as Battery-Driven Traveling Device>>

Figure 1:
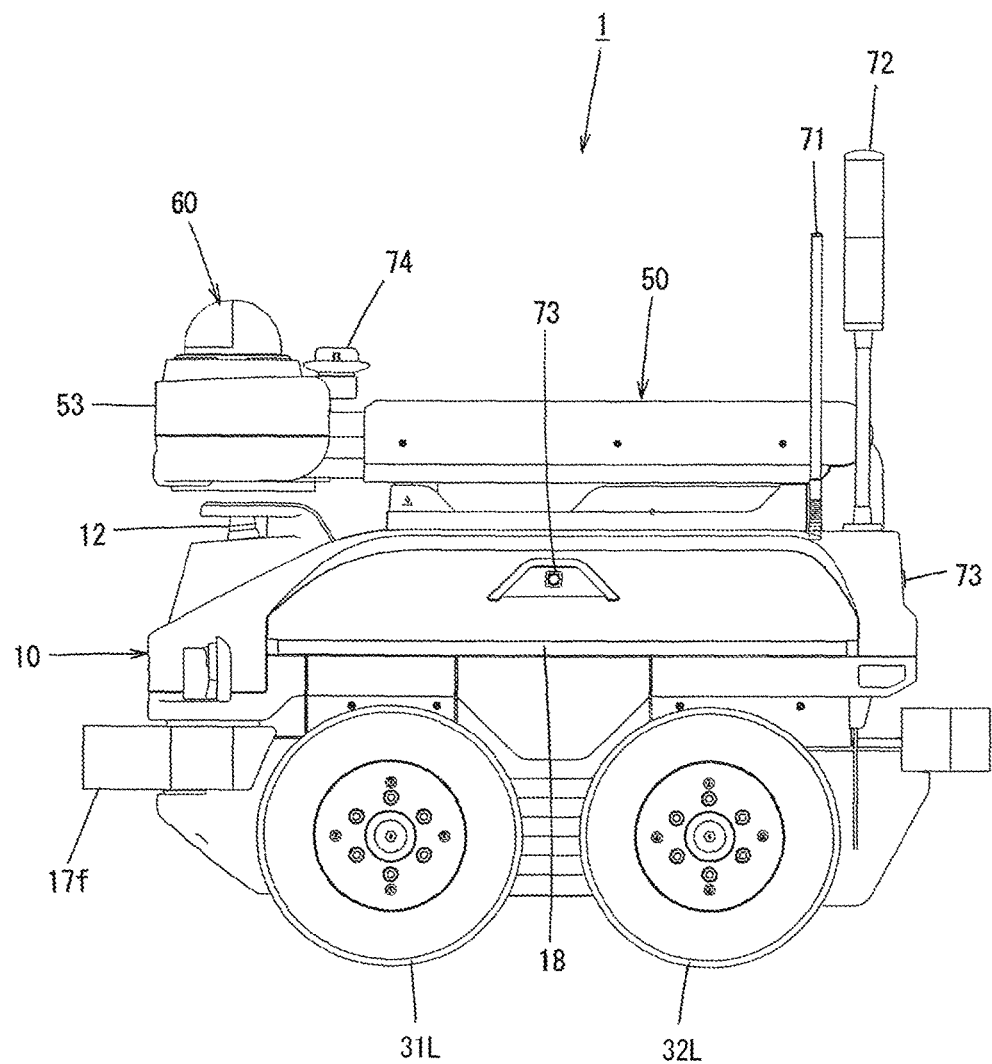
FIG. 1 is a side view illustrating an external appearance of an autonomous vehicle which is one aspect of a battery-driven traveling device according to the present invention.
Figure 2:
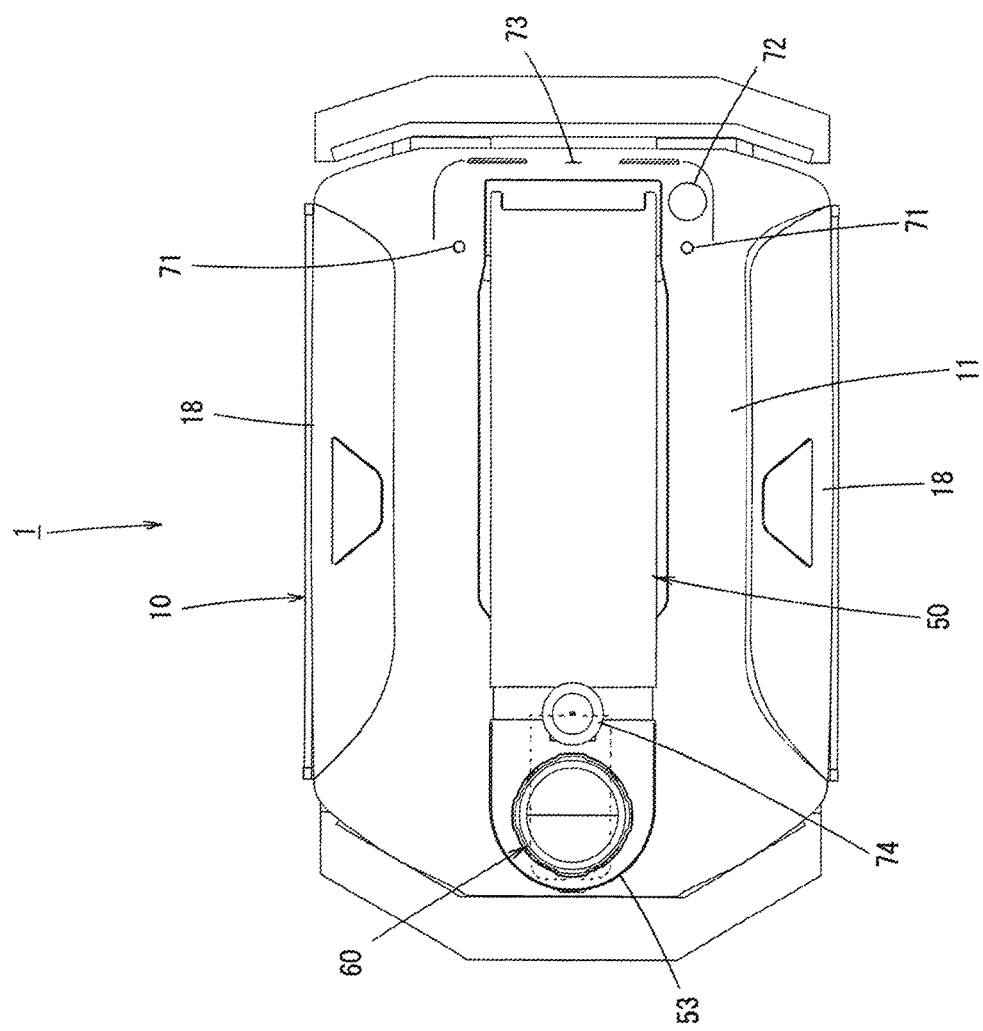
FIG. 2 is a plan view of the autonomous vehicle illustrated in FIG. 1.

FIG. 1 is a side view illustrating an external appearance of an autonomous vehicle which is one aspect of a battery-driven traveling device according to the present invention. FIG. 2 is a plan view of the autonomous vehicle illustrated in FIG. 1.

As illustrated in FIGS. 1 and 2, an autonomous vehicle 1 mainly includes an electric chassis 10, and a cover 18 and a lifting and lowering mechanism 50 which are provided on the electric chassis 10.

A surveillance camera 60 serving as an imaging unit is provided on the leading end of the lifting and lowering mechanism 50. In addition, a distance detection unit 12 is mounted on the front end of the electric chassis 10, and a Wi-Fi antenna 71 and a warning light 72 are mounted on the rear end of the electric chassis 10. CCD cameras 73 are mounted on left and right side surfaces and rear surface of the electric chassis 10. A GPS antenna 74 is provided at the back of the surveillance camera 60 on the leading end of the lifting and lowering mechanism 50.

The autonomous vehicle 1 is used as a surveillance robot that surveils a condition inside or around a building or in a predetermined site.

The distance detection unit 12 has a function of confirming a front region in a traveling direction and a state of a road surface, and includes a light-emitting unit that emits light, a light-receiving unit that receives light, and a scanning control unit that scans an emission direction of light so that the light is emitted to a plurality of predetermined measured points in the space ahead.

LIDAR (Light Detection and Ranging or Laser Imaging Detection and Ranging) that measures distances at a plurality of measured points in a predetermined distance measurement region by emitting laser to a two-dimensional space or a three-dimensional space in the distance measurement region can be employed for the distance detection unit 12.

The electric chassis 10 includes a chassis body 11 serving as a framework section, and four wheels (including front wheel 31L and rear wheel 32L illustrated in FIG. 1 and a front wheel 31R and a rear wheel 32R on the right side not illustrated in FIG. 1) mounted on front, rear, left, and right of the chassis body 11. The electric chassis 10 also includes a pair of motors that independently drives the rotations of left and right front wheels 31L and 31R, a battery (not illustrated in FIG. 1) that supplies electric power to these motors, the distance detection unit 12, and a system controller (not illustrated in FIG. 1) that controls an operation of each unit.

The system controller 100 is a section implementing a traveling function, a surveillance function, or the like of the autonomous vehicle 1, and includes, as hardware resources, a CPU as a core, and a memory, an input/output interface circuit, a timer circuit, a communication interface circuit, and the like.

The autonomous vehicle 1 is configured to preliminarily store map information and moving route information of a region where the autonomous vehicle 1 is to travel, and to travel on a predetermined route, while avoiding an obstacle, by utilizing information acquired from the surveillance camera 60, the distance detection unit 12, and GPS (Global Positioning System).

While traveling, the autonomous vehicle 1 recognizes a posture of a person issuing an instruction by particularly utilizing the surveillance camera 60, the distance detection unit 12, or the like, and autonomously travels while recognizing the condition ahead of the electric chassis 10 in the direction of travel on the basis of the instruction previously associated with the posture. For example, when detecting that there is an obstacle or a step ahead, the autonomous vehicle 1 stops, turns, moves backward, or moves forward to change its course, and executes a function corresponding to the instruction, in order to prevent the collision against the obstacle. Then, the autonomous vehicle 1 executes the process according to the given instruction.

In the autonomous vehicle 1 illustrated in FIG. 1, the total length of the vehicle body is about 1.4 meters, the entire width is about 0.85 meter, the diameter of each wheel is about 0.4 meter, and the weight of the vehicle body is about 200 kilograms. In addition, the rated output of each of the motors that respectively drive the left and right wheels is 400 watts.

<<Description of Electric Chassis>>

Next, the electric chassis 10 will be described.

The electric chassis 10 includes the chassis body 11, and a pair of front wheels 31L and 31R and a pair of rear wheels 32L and 32R provided on left and right of the chassis body 11. The electric chassis 10 also includes two motors 41L and 41R that independently drive the rotations of a pair of left and right front wheels or rear wheels, a battery 40 that supplies electric power to these two motors 41L and 41R, the distance detection unit 12, and a control unit not illustrated.

Figure 3:
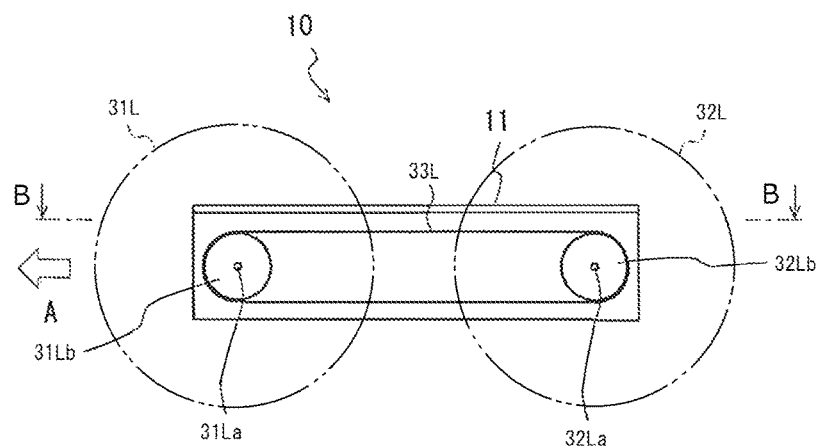
FIG. 3 is a right side view for describing a schematic configuration of an electric chassis of the autonomous vehicle illustrated in FIG. 1.
Figure 4:
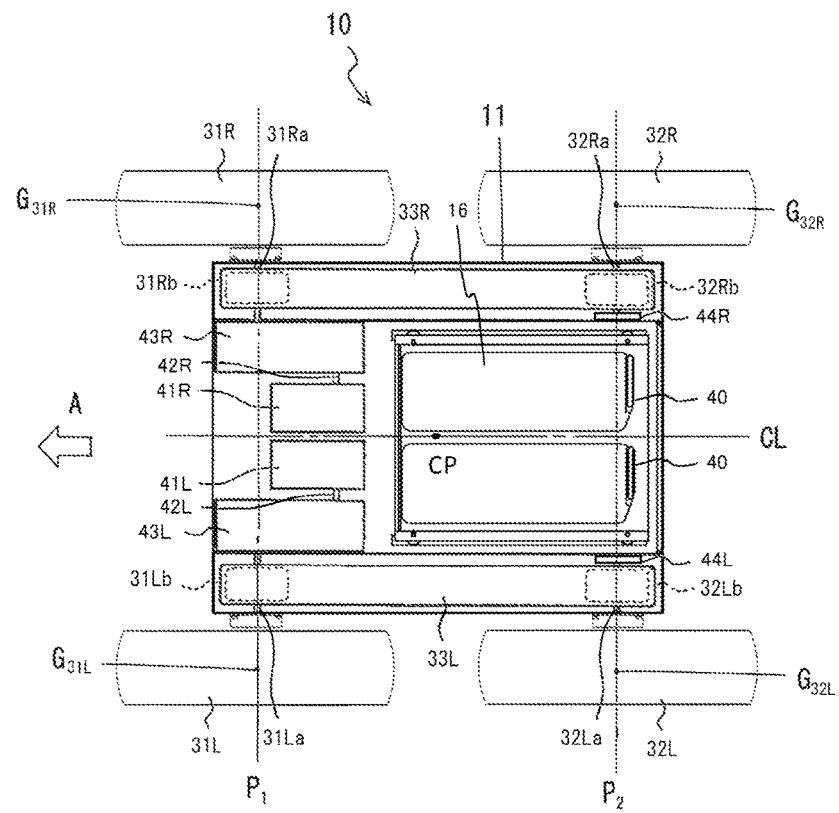
FIG. 4 is a sectional view as viewed from a line B-B in FIG. 3.

FIG. 3 is a right side view for describing the schematic configuration of the electric chassis of the autonomous vehicle illustrated in FIG. 1. FIG. 4 is a sectional view as viewed from a line B-B in FIG. 3.

In the present embodiment, the chassis body 11 moves forward in a direction of an arrow A as illustrated in FIGS. 3 and 4. The left and right wheels close to the arrow A are front wheels 31L and 31R, and the left and right wheels distant from the arrow A are rear wheels 32L and 32R. The front wheels 31L and 31R are independently controlled and driven by two motors 41L and 41R.

The chassis body 11 is provided with axles 31La and 31Ra that rotationally support the front wheels 31L and 31R and axles 32La and 32Ra that rotationally support the rear wheels 32L and 32R. The axles 31La and 31Ra for the front wheels 31L and 31R are located on a same first axis $P_1$.

Similarly, the axles 32La and 32Ra for the rear wheels 32L and 32R are located on a same second axis $P_2$.

The front wheels 31L and 31R are connected respectively to the rear wheels 32L and 32R by belts 33L and 33R serving as power transmission members. Specifically, a pulley 31Lb is mounted on the axle 31La for the left front wheel 31L, and a pulley 32Lb is mounted on the axle 32La for the rear wheel 32L. A plurality of grooves is formed on the outer circumferential surfaces of the pulleys 31Lb and 32Lb along the axle direction. A belt 33L which has protrusions formed on the inner surface thereof to be meshed with the grooves on the outer circumferences of the pulleys 31Lb and 32Lb is stretched between the pulley 31Lb and the pulley 32Lb.

Similarly, a pulley 31Rb is mounted on the axle 31Ra for the right front wheel 31R, and a pulley 32Rb is mounted on the axle 32Ra for the rear wheel 32R. A belt 33R is stretched between the pulley 31Rb and the pulley 32Rb.

Two motors which are the motor 41L for driving the front wheel 31L and the rear wheel 32L on the left and the motor 41R for driving the front wheel 31R and the rear wheel 32R on the right are provided inside of the chassis body 11 so as to be closer to the front wheels. A gear box 43R is provided as a power transmission mechanism between a motor shaft 42R of the right motor 41R and the axle 31Ra for the right front wheel 31R. Similarly, a gear box 43L is provided as a power transmission mechanism between a motor shaft 42L of the left motor 41L and the axle 31La for the left front wheel 31L. In this configuration, the left and right motors 41L and 41R are arranged side by side in a symmetrical manner with respect to a centerline CL of the chassis body 11 in the direction of travel (the arrow A direction), and the gear boxes 43L and 43R are mounted outside of the motors 41L and 41R, respectively.

The left and right rear wheels 32L and 32R are pivotally supported by bearings 44L and 44R, respectively. The bearings 44L and 44R are respectively mounted to be closer to the right side surface and the left side surface of the chassis body 11.

According to this configuration, the front wheel 31L and the rear wheel 32L on the left side and the front wheel 31R and the rear wheel 32R on the right side, in the direction of travel, can be independently driven.

If the left and right motors 41L and 41R have a same rotational speed, the vehicle 1 moves forward or backward by adjusting the gear boxes 43L and 43R to have a same gear ratio (reduction ratio). To change the speed of the vehicle 1, the gear ratios of the gear boxes 43L and 43R may be changed while being kept at the same value.

To change the direction of travel, the gear ratios of the gear boxes 43L and 43R may be changed to generate a difference between the rotational speed of the left front wheel 31L and the rear wheel 32L and the rotational speed of the right front wheel 31R and the rear wheel 32R. In addition, when the right wheels and the left wheels are rotated in opposite directions at a same rotating speed by changing the rotating direction of the output from each of the gear boxes 43R and 43L, the vehicle 1 can turn while stationary. Specifically, the vehicle 1 can turn around a center point CP of a rectangular area enclosed by centers $G_{31L}$, $G_{31R}$, $G_{32L}$, and $G_{32R}$ of four contact areas of a pair of front wheels 31L and 31R and a pair of rear wheels 32L and 32R. This corresponds to skid steer driving. The point CP is a turning center. In the first embodiment, the central part of the chassis body 11 is set to substantially coincide with the turning center CP.

The motors 41L and 41R are driven by the battery 40 such as a lithium ion battery. The battery 40 is stored in a battery storage section 16. Specifically, the battery 40 has an outer shape of substantially a rectangular solid, and can be placed on substantially the center position of the chassis body 11 in the lateral direction as illustrated in FIG. 4. In addition, the back surface of the chassis body 11 is configured to be openable to facilitate insertion/removal of the battery 40 into/from the battery storage section 16. This configuration enables a user to easily store the large-capacity battery 40 for implementing long drive into the battery storage section 16. In addition, the user can easily do a work for replacement, charging, or maintenance of the battery 40 from a back surface 14. Furthermore, the battery 40 can be placed on the bottom part of the autonomous vehicle 1, whereby a low center of gravity is achieved and stable travel can be implemented.

<<Battery Storage Section>>

The detail of the battery storage section 16 will be described.

Figure 5:
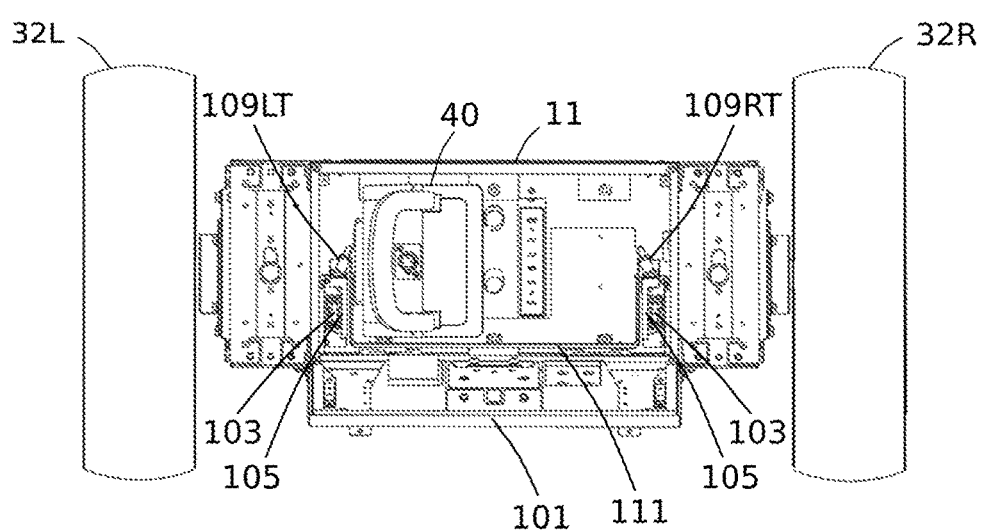
FIG. 5 is a back view illustrating a chassis body and front and rear wheels of the autonomous vehicle illustrated in FIGS. 3 and 4 as viewed from back.
Figure 6:
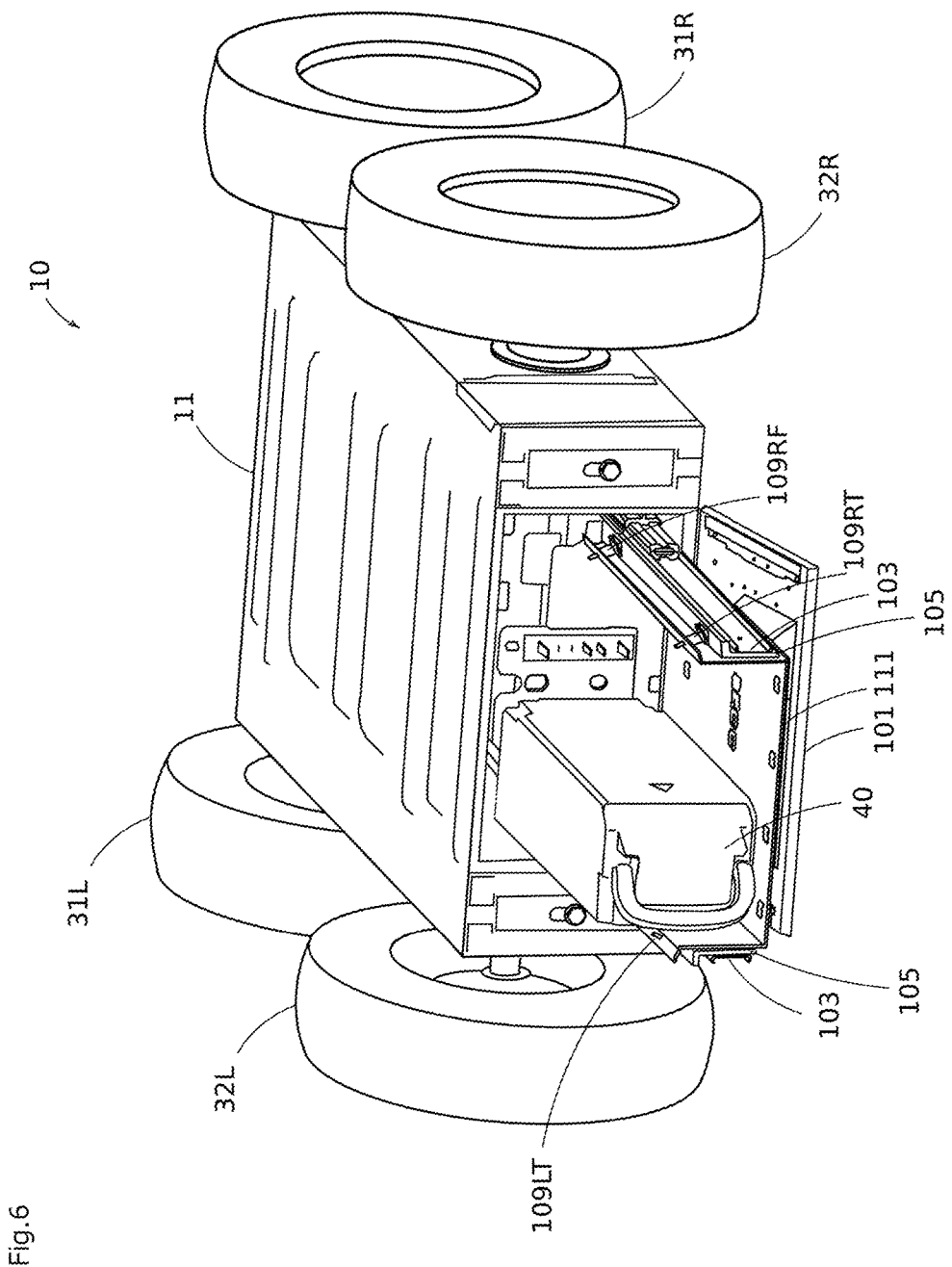
FIG. 6 is a perspective view illustrating the chassis body and the front and rear wheels of the autonomous vehicle illustrated in FIGS. 3 and 4 as viewed from right oblique back.
Figure 7:
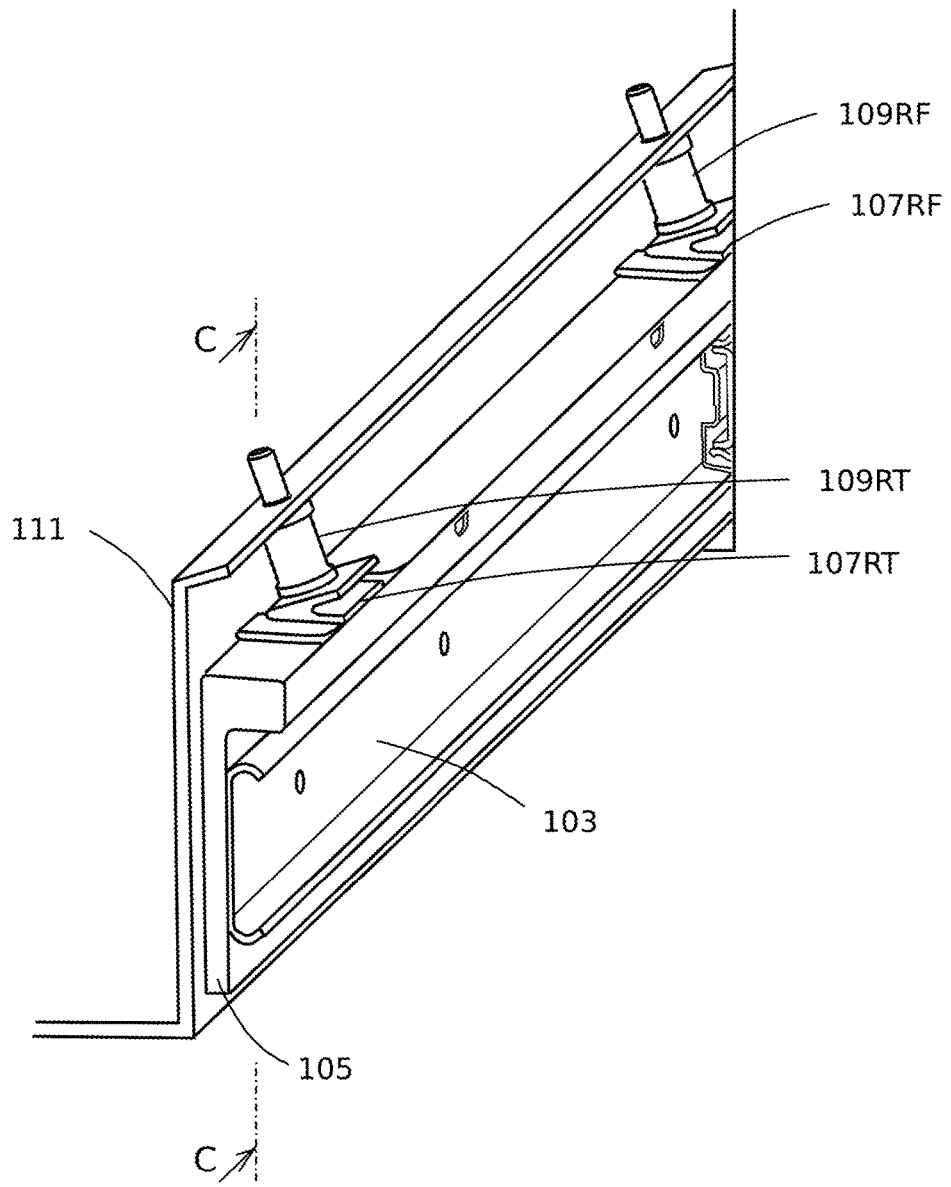
FIG. 7 is an explanatory view illustrating a vicinity of a right slide rail illustrated in FIG. 6 as enlarged.
Figure 8:
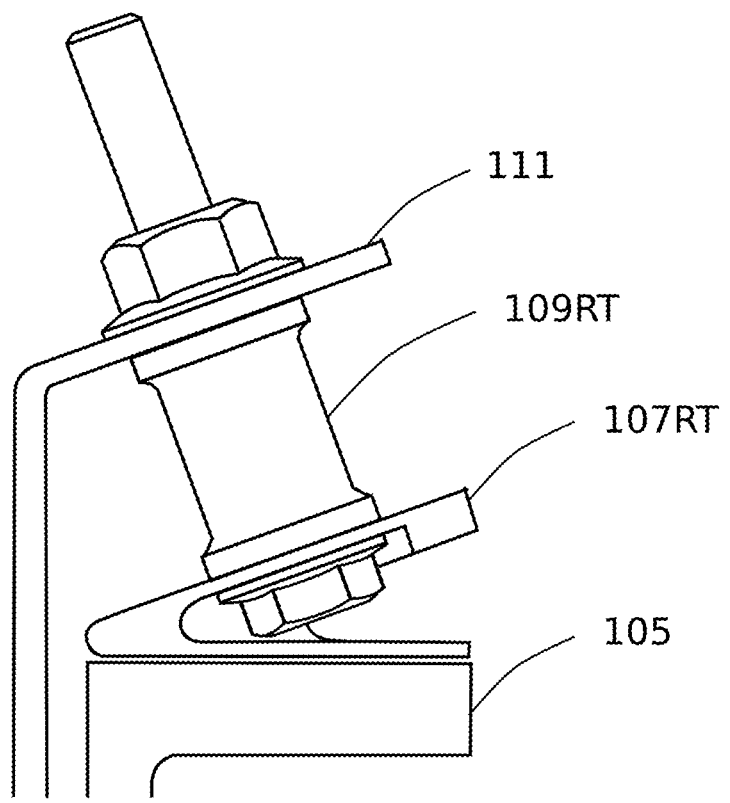
FIG. 8 is a sectional view illustrating a surrounding of a damper in the cross-section taken along a line C-C in FIG. 7.
Figure 9:
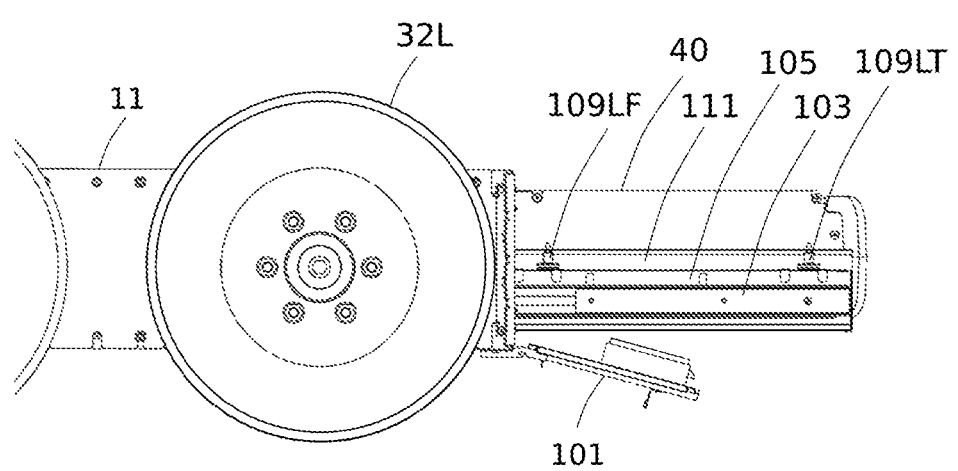
FIG. 9 is a side view illustrating a state in which a battery is drawn from back of the chassis of the autonomous vehicle illustrated in FIGS. 3 and 4.

FIG. 5 is a back view of the chassis body 11 and the front and rear wheels of the autonomous vehicle 1 illustrated in FIGS. 3 and 4 as viewed from back. FIG. 6 is a perspective view illustrating the chassis body 11 and the front and rear wheels of the autonomous vehicle 1 illustrated in FIGS. 3 and 4 as viewed from right oblique back. FIG. 7 is an explanatory view illustrating a vicinity of a right slide rail illustrated in FIG. 6 as enlarged. FIG. 8 is a sectional view illustrating a surrounding of a damper in the cross-section taken along a line C-C in FIG. 7. FIG. 9 is a side view illustrating a state in which the battery is drawn from back of the chassis of the autonomous vehicle illustrated in FIGS. 3 and 4.

As illustrated in FIGS. 5 and 6, a battery chamber cover 101 is provided on the center at the rear part of the chassis body 11. The battery chamber cover 101 is opened about a lower end as a supporting point, and has inside slide rails 103 on both of left and right sides, the slide rails 103 being substantially horizontally extensible in the front-rear direction.

The exterior parts of the slide rails 103 on both of left and right sides are fixed to the chassis body 11 serving as a framework section, and the interior parts thereof can be drawn forward (toward the back of the chassis body 11) with the battery chamber cover 101 being opened.

The slide rails illustrated in FIG. 6 have ball bearings attached to sliding sections, so that they smoothly slide with low force.

Inverted L-shaped side plates 105 are attached respectively to the interior parts of the left and right slide rails. The part corresponding to a long linear part of the inverted L shape is attached to the slide rail 103, and extends from a lower end toward an upper end in substantially a vertical direction.

The part corresponding to a short linear part of the inverted L shape serves an upper end of the inverted L-shaped side plate 105, is higher than the upper end of the slide rail 103, and extends substantially horizontally outward.

Dampers 109RF and 109RT are mounted on two locations in the front-rear direction on the upper surface of the inverted L-shaped side plate 105 through wedge-shaped damper supporting members 107RF and 107RT. Similar to the right slide rail, the left slide rail is provided with dampers 109LF and 109LT on two locations in the front-rear direction. The detail is illustrated in FIGS. 7 and 8. In FIGS. 5 and 6, the front damper is not visible, and only the rear damper 109LT is illustrated. In FIG. 9, the front damper 109LF is illustrated.

Various dampers of various materials and shapes are commercially available, and they are generally designed to absorb vibration in a specific direction (hereinafter referred to as a Z direction or a vibration absorption direction in the present specification), so that they have less or no capacity of absorbing vibration in an X direction or Y direction orthogonal to the Z direction, as compared to the capacity of absorbing vibration in the Z direction.

However, a vehicle body does not vibrate in only one direction (for example, in the vertical direction). When the vehicle body turns, vibration in the lateral direction also occurs. Particularly, vibration in the lateral direction occurs when the vehicle body performs turning drive called skid steer (also referred to as a stationary turn) to change the direction of the vehicle body in a narrow space. Specifically, it is the case of turning the vehicle body on the spot by utilizing the difference in rotations between the wheels. When the vehicle is a four-wheel vehicle, the left front and rear wheels are moved forward and at the same time, the right front and rear wheels are moved backward, to skid the vehicle, by which the vehicle body turns in a clockwise direction almost on the spot. On the contrary, when the left front and rear wheels are moved backward and at the same time, the right front and rear wheels are moved forward, to skid the vehicle, the vehicle body turns in a counterclockwise direction almost on the spot. A mechanism for skidding the wheels may also be provided.

When the vehicle body rapidly turns due to the skid steer driving, large lateral force is exerted on the vehicle-mounted battery. Particularly, large force is exerted upon the start and stop of the turn.

In addition, force in the front-rear direction is also exerted on the vehicle-mounted battery upon acceleration and deceleration.

Hereinafter, the detail of the right rear damper 109RT out of four dampers will be described. However, the other dampers have the same configuration.

FIG. 7 is an explanatory view illustrating the vicinity of the right slide rail illustrated in FIG. 6 as enlarged. FIG. 8 is a sectional view illustrating the surrounding of the damper in the cross-section taken along the line C-C in FIG. 7. FIG. 9 is a side view illustrating a state in which the battery is drawn from back of the chassis of the autonomous vehicle illustrated in FIGS. 3 and 4.

The damper supporting member 107RT has a wedge shape of which tip end forms an acute angle of about 20 degrees, and a lower side sandwiching the tip end of the wedge is fixed on the upper surface of the inverted L-shaped side plate 105. A nut on the lower end of the cylindrical damper 109RT is fastened, by a bolt, to the upper side sandwiching the tip end of the wedge.

The damper 109RT absorbs vibration by utilizing elasticity of a rubber material. This type of damper is often used for automobiles, for example. As a basic structure, the damper is configured to have a seat and a bolt attached on both ends of a cylindrical (or disc-shaped, if the height is smaller than the diameter) rubber material. As the material of the rubber material, natural rubber (NR), styrene-butadiene rubber (SBR), nitrile rubber (NBR), polychloroprene (CR), isobutene-isoprene rubber (IIR, so-called butyl rubber), etc. is used according to usage.

The rubber material absorbs vibration in three directions: in the diameter direction (X and Y directions) of the cylinder and the axial direction (Z direction, hereinafter also referred to as Z-axis direction) of the cylinder. However, the cylindrical damper is generally designed such that a spring constant in the Z-axis direction is larger than that in the diameter direction (X and Y directions) to absorb vibration while supporting a load in the Z direction.

A damper rubber may be formed to have a V shape or a U shape, in place of the cylindrical shape, to receive a load on the recessed section. The present invention does not exclude dampers having these shapes from the scope of the invention. However, as compared to the dampers having these shapes, the cylindrical damper can be mounted in a manner similar to fixing two members using a bolt, a nut, and a washer. Therefore, particular consideration is not required for a design or a space for a portion where the damper is to be mounted, whereby the damper is easily designed and easy to be disposed in a limited space.

A tray-shaped battery supporting member 111 on which the battery 40 is to be placed is attached to the upper end of the damper 109RT. The battery supporting member 111 is provided to place the battery 40 in a space enclosed by the left and right slide rails 103 and the inverted L-shaped side plates 105. As illustrated in FIGS. 5 and 6, the battery supporting member 111 is a recessed member as viewed from the back surface of the chassis body 11, and faces the left and right inverted L-shaped side plates 105 with a certain distance so that both side walls of the member 111 is not in contact with the inverted L-shaped side plates 105 even if the chassis body 11 vibrates during travel. The upper ends of both side walls extend outward as being bent at an angle of about 70 degrees with respect to the vertical direction, and the upper ends are respectively fixed to the upper ends of four dampers on four locations on front, rear, left, and right.

As illustrated in FIG. 5, the Z directions of the dampers on left and right are inclined, on the upper ends thereof, at an angle of about 20 degrees with respect to the vertical direction, and extends toward the center of the chassis body 11, as viewed from the back of the chassis body 11. The upper ends of the battery supporting member 111 which are bent outward at an angle of 70 degrees with respect to the vertical direction perpendicularly intersect the Z directions of the dampers.

Note that the Z directions of the left and right dampers are along the vertical direction in the front-rear direction as illustrated in FIG. 9.

As described above, according to the present embodiment, the upper ends of the battery supporting member 111 are bent outward to be connected to the upper ends of the dampers, whereby the battery can be placed in the recessed section of the battery supporting member 111, that is, on the bottom part of the chassis body 11. This configuration can avoid the generation of a space between the bottom part of the chassis body 11 and the battery, thereby being capable of reducing a height of the chassis body 11 and thus a height of the autonomous vehicle 1.

If the height of the vehicle is increased, the center of gravity of the vehicle body is on a higher position. However, considering that the autonomous vehicle 1 travels on a rough road or rapidly turns by skid steer driving, the center of gravity is demanded to be on a position as low as possible from the viewpoint of travel stability.

Notably, there is a possibility that the vehicle width is increased because the upper ends of the battery supporting member 111 are bent outward. However, in the present embodiment, the upper ends are in a space above the slide rails 103, thereby having no effect on the width of the vehicle body, as illustrated in FIG. 5.

In addition, the dampers are disposed between the slide rails 103 and the upper ends of the battery supporting member 111 to relax vibration transmitted to the battery 40 from the chassis body 11.

It is general that a cylindrical damper is disposed just below a heavy component such as the battery 40 for absorbing vibration while supporting a load. However, if so, a space for disposing the damper is caused between the bottom part of the chassis body 11 and the battery 40. According to the configuration of disposing the damper above the slide rail 103 as in the present embodiment, vibration to the battery 40 can be relaxed without raising the center of gravity of the vehicle body.

Notably, an increase in the vehicle width brings advantages as well as disadvantages to a vehicle which turns by skid steer driving, such as the vehicle in the present embodiment. That is, when the vehicle width is increased, the vehicle can turn with less torque and stably travel while turning.

In the present embodiment, the dampers are disposed such that the Z directions thereof are inclined in a symmetrical manner with respect to the vertical direction. Therefore, when the battery 40 is mounted, force for positioning the battery supporting member 111 on the center of the chassis body 11 is exerted due to the weight of the battery, and thus, the battery supporting member 111 is not in contact with the inverted L-shaped side plates 105 on the side.

In skid steer driving accompanied by a rapid turning operation, the battery 40 and the battery supporting member 111 sway from side to side in turning, and may collide against the inverted L-shaped side plates 105 facing the battery 40 and the battery supporting member 111. However, the Z directions of the dampers are inclined in a symmetrical manner with respect to the vertical direction, and thus, even if the battery 40 sways from side to side in turning, force for positioning the battery 40 on the center of the chassis body 11 is exerted.

The configuration of the present embodiment will be compared to a configuration in which dampers are disposed such that the Z directions thereof extend along the vertical direction. In the configuration for comparison, a damper having a spring constant larger than that in the present embodiment needs to be selected for withstanding the sway in turning. If so, the spring constant in the Z direction (vertical direction) becomes too large, raising a possibility of deteriorating the damper effect.

Second Embodiment

In the first embodiment, the slide rails 103 are fixed to the chassis body 11; the dampers are disposed above the slide rails 103; and the dampers are provided between the slide rails 103 and the battery supporting member 111.

As a different aspect, one of dampers may be fixed to the chassis body 11, and the other may be directly or indirectly fixed to the slide rails 103. In this case, the battery supporting member 111 is directly or indirectly fixed to the slide rails 103.

Further, dampers may be disposed below the slide rails 103; the upper ends of the battery supporting member 111 extending outward as being bent are above the slide rails 103; the lower ends of the dampers may be fixed to the chassis body 11 through wedge-shaped damper supporting members; and the upper ends of the dampers may be fixed to the slide rails through L-shaped side plates. In this case, the L-shaped side plates are bent at an angle of about 70 degrees. According to this configuration, the vehicle width and vehicle height equal to those in the first embodiment can be achieved.

Third Embodiment

In the first embodiment, the left and right dampers are disposed such that the axes (Z axes) of the left and right dampers are inclined in a symmetrical manner to intersect each other on a higher position at the center of the chassis body 11 as viewed from the back of the chassis body 11 (for example, see FIG. 5). However, the dampers may be inclined in a direction opposite to the above direction in a symmetrical manner. Specifically, the dampers may be disposed such that the Z axes thereof are inclined in a symmetrical manner to intersect each other on a lower position at the center of the chassis body 11.

Figure 10A:
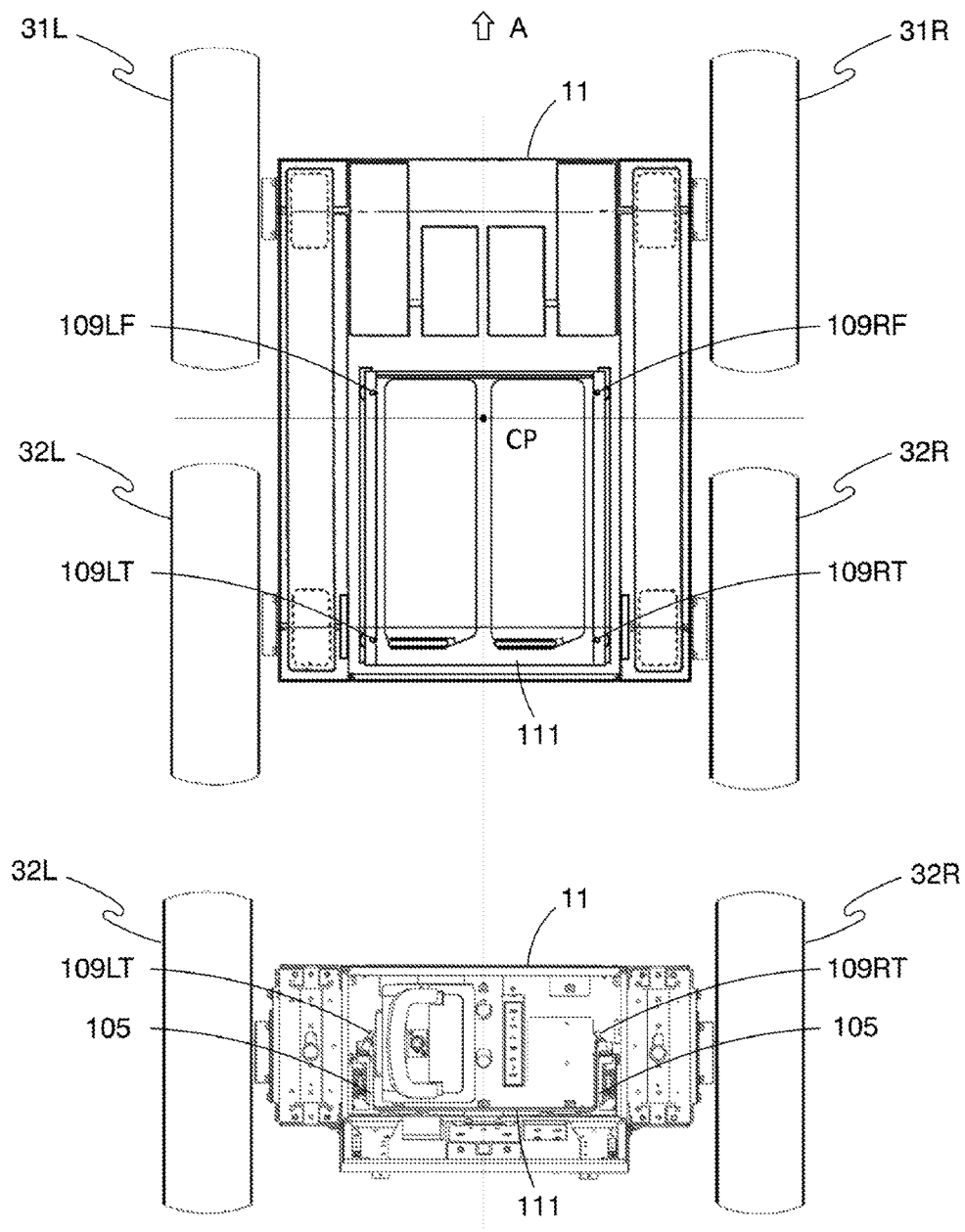
FIG. 10A is an explanatory view in which the plan view of the chassis body illustrated in FIG. 4 and the back view illustrated in FIG. 5 are arranged.
Figure 10B:
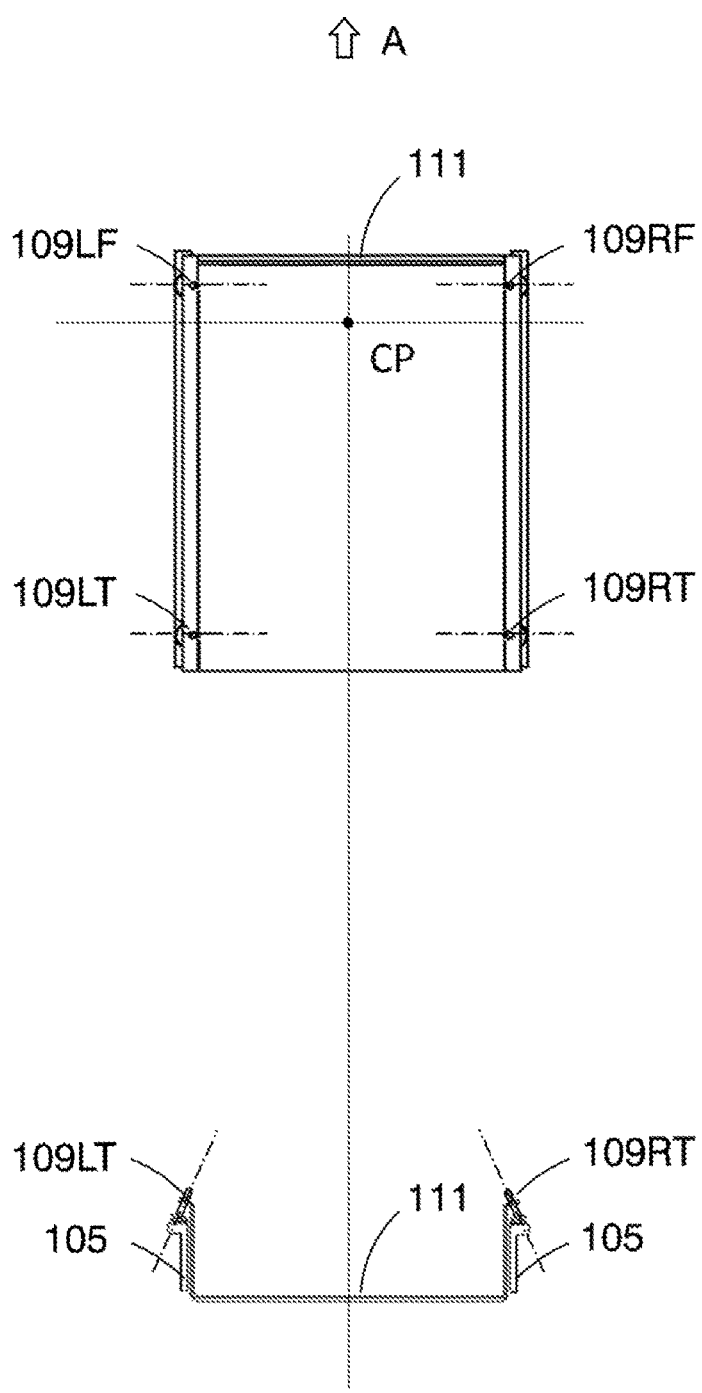
FIG. 10B is an explanatory view illustrating, in a simplified manner, the arrangement of a battery supporting member and dampers extracted from the explanatory view in FIG. 10A.
Figure 11:
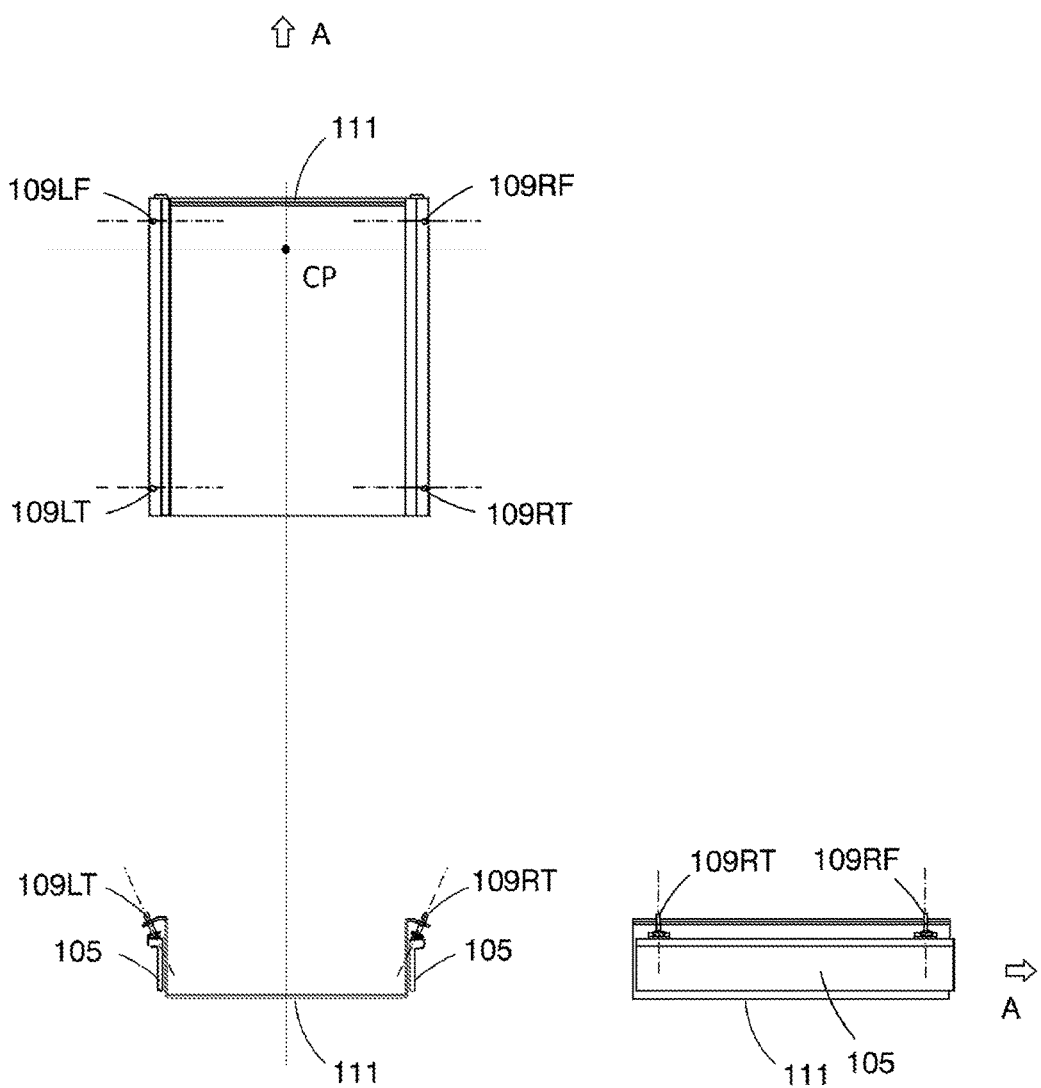
FIG. 11 is an explanatory view of an aspect in which Z axes of left and right dampers are inclined to intersect each other on a lower position, as a modification of the arrangement of the dampers illustrated in FIG. 10B (third embodiment)

FIG. 10A is an explanatory view in which the plan view of the chassis body 11 illustrated in FIG. 4 and the back view illustrated in FIG. 5 are arranged. FIG. 10B is an explanatory view illustrating, in a simplified manner, the arrangement of the battery supporting member 111 and the dampers extracted from the explanatory view in FIG. 10A. In FIG. 10B, the shape of the damper is illustrated as a simplified cylinder as compared to the shape in FIG. 10A. FIG. 11 is an explanatory view illustrating, as a modification of the arrangement of the dampers illustrated in FIG. 10B, an aspect in which the Z axes of the left and right dampers are inclined to intersect each other on a lower position.

Different from the first embodiment, the respective damper supporting members are attached to the inverted L-shaped side plates 105 in such a way that wedge-shaped tip ends are directed outwardly, and the upper ends of the battery supporting member 111 are bent outward at an angle of 110 degrees with respect to the vertical direction as illustrated in FIG. 11. Thus, this embodiment can be implemented.

Even when the Z directions of the dampers are inclined as described above, force for positioning the battery supporting member 111 on the center of the chassis body 11 is exerted due to the weight of the battery as in the first embodiment, so that the battery supporting member 111 is not in contact with the inverted L-shaped side plates 105 on the side. Further, even when the battery 40 sways from side to side while in turning, force for positioning the battery 40 on the center of the chassis body 11 is exerted.

Fourth Embodiment

As illustrated in FIGS. 4 and 6, in the above-mentioned embodiments, the left and right slide rails 103 are disposed along the front-rear direction, and the battery supporting member 111 is drawn toward the back of the chassis body. The dampers 109LF, 109LT, 109RF, and 109RT are inclined not in the direction of travel, but in the direction perpendicular to the direction of travel, with respect to the vertical direction.

However, the gist of the present invention is not limited thereto. For example, the present invention encompasses a configuration in which the left and right slide rails 103 are disposed along the lateral direction perpendicular to the front-rear direction, and the battery supporting member 111 is drawn toward the side of the chassis. So long as the turning center CP is located between the dampers on both the left and right sides of the battery supporting member 111, the dampers are disposed such that the Z-axis directions of the dampers are inclined in a symmetrical manner with respect to the vertical direction. That is, so long as the turning center CP is present between the front damper and the rear damper in the direction of travel, the front and rear dampers are disposed such that the Z axis of the front damper in the direction of travel and the Z axis of the rear damper in the direction of travel intersect each other on a higher position or a lower position as viewed from the side of the chassis body 11.

According to this configuration, transverse vibration applied to the battery can be relaxed when the vehicle body turns in a clockwise direction or in a counterclockwise direction.

Fifth Embodiment

The degree of inclination of the dampers may differ according to a distance from the turning center.

Figure 12:
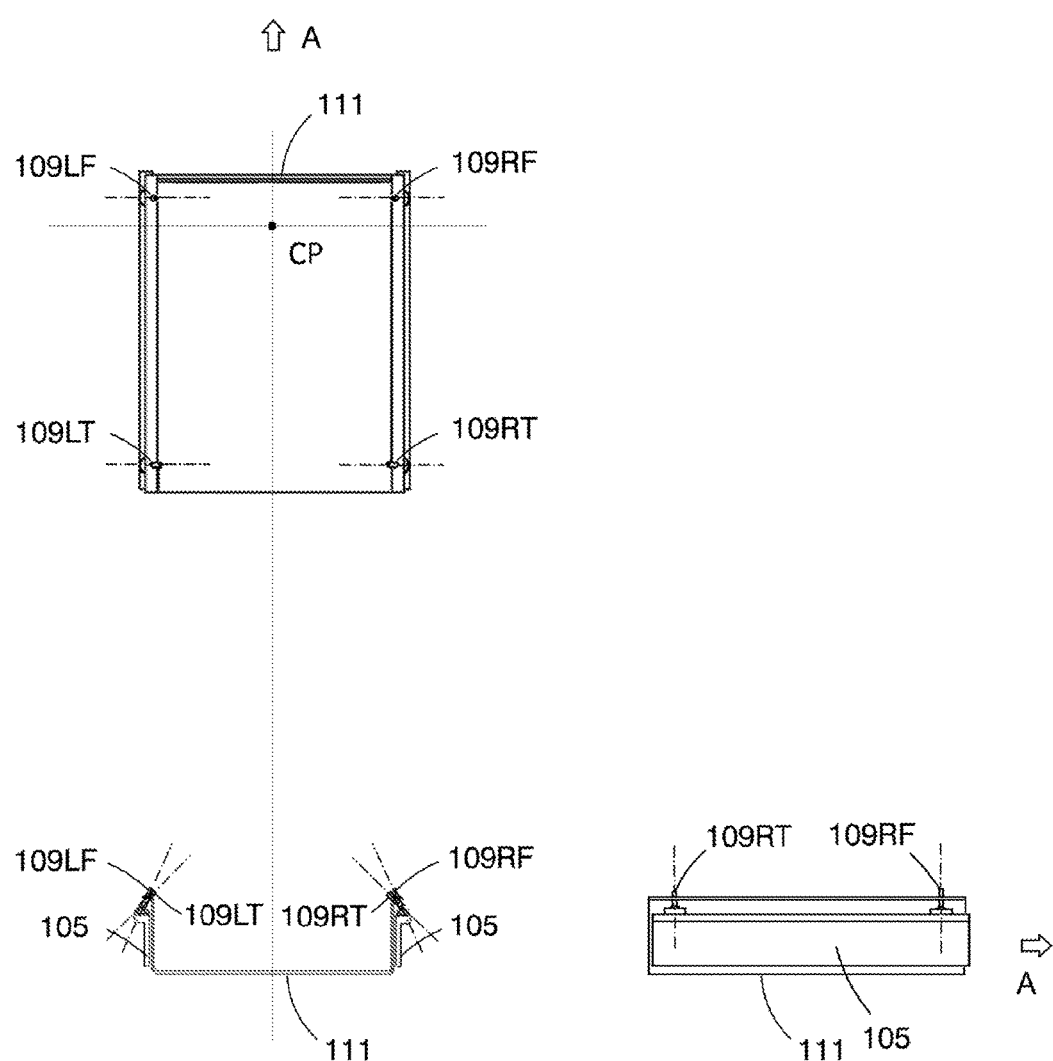
FIG. 12 is an explanatory view of an aspect in which a damper distant from a turning center is more greatly inclined as a modification of the arrangement of the dampers illustrated in FIG. 10B (fifth embodiment)

FIG. 12 is an explanatory view illustrating, as a modification of the arrangement of the dampers illustrated in FIG. 10B, an aspect in which a damper distant from the turning center is inclined more.

As illustrated in FIG. 12, the rear dampers 109LT and 109RT distant from the turning center CP are more greatly inclined than the front dampers 109LF and 109LR with respect to the vertical direction.

The larger the distance from the turning center CP is, the larger the turning radius and turning speed are. Therefore, large force is applied upon the start and stop of a turn according to acceleration/deceleration for the turn. The configuration in which the inclination of the damper on a position more distant from the turning center CP is increased enables leveling of relaxation of the vibration caused by the force.

Figure 13:
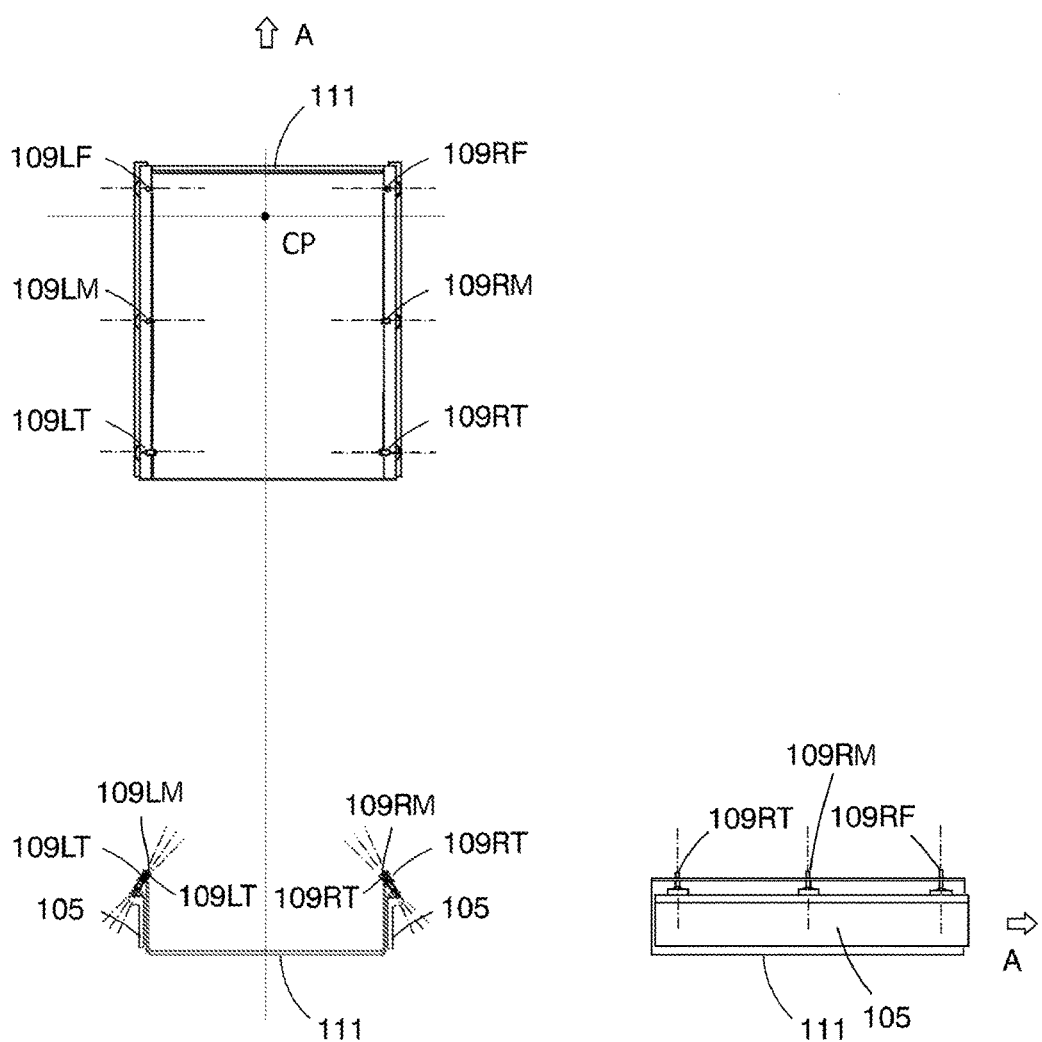
FIG. 13 is an explanatory view of an aspect in which three dampers are arranged on each left and right side in a direction of travel, and an inclination degree is increased toward a damper distant from a turning center, as another modification of the arrangement of the dampers illustrated in FIG. 10B (fifth embodiment)

FIG. 13 is an explanatory view of an aspect in which three dampers are arranged on each left and right side in the direction of travel, and an inclination degree is increased toward a damper distant from the turning center CP. In FIG. 13, the dampers 109LT and 109RT most distant from the turning center CP are more greatly inclined than the dampers 109LM and 109RM closer to the turning center CP than the dampers 109LT and 109RT. The dampers 109LM and 109RM are more greatly inclined than the dampers 109LF and 109RF closest to the turning center CP. When three or more dampers are arranged on each of the left and right sides as described above, an inclination may be varied according to the distance from the turning center.

Sixth Embodiment

In the first embodiment, as illustrated in FIG. 9, the Z axes of the respective dampers are directed to the vertical direction when the front and rear dampers are viewed from the side surface of the chassis body 11. However, the dampers may be disposed such that the Z axes thereof may also be inclined in the direction of travel. According to this configuration, force for positioning the battery 40 with respect to the chassis body 11 is exerted even if the battery 40 sways from side to side upon starting and stopping the vehicle.

Specifically, the dampers may be disposed to be inclined in a symmetrical manner both as viewed from the back and side of the chassis body 11.

Figure 14:
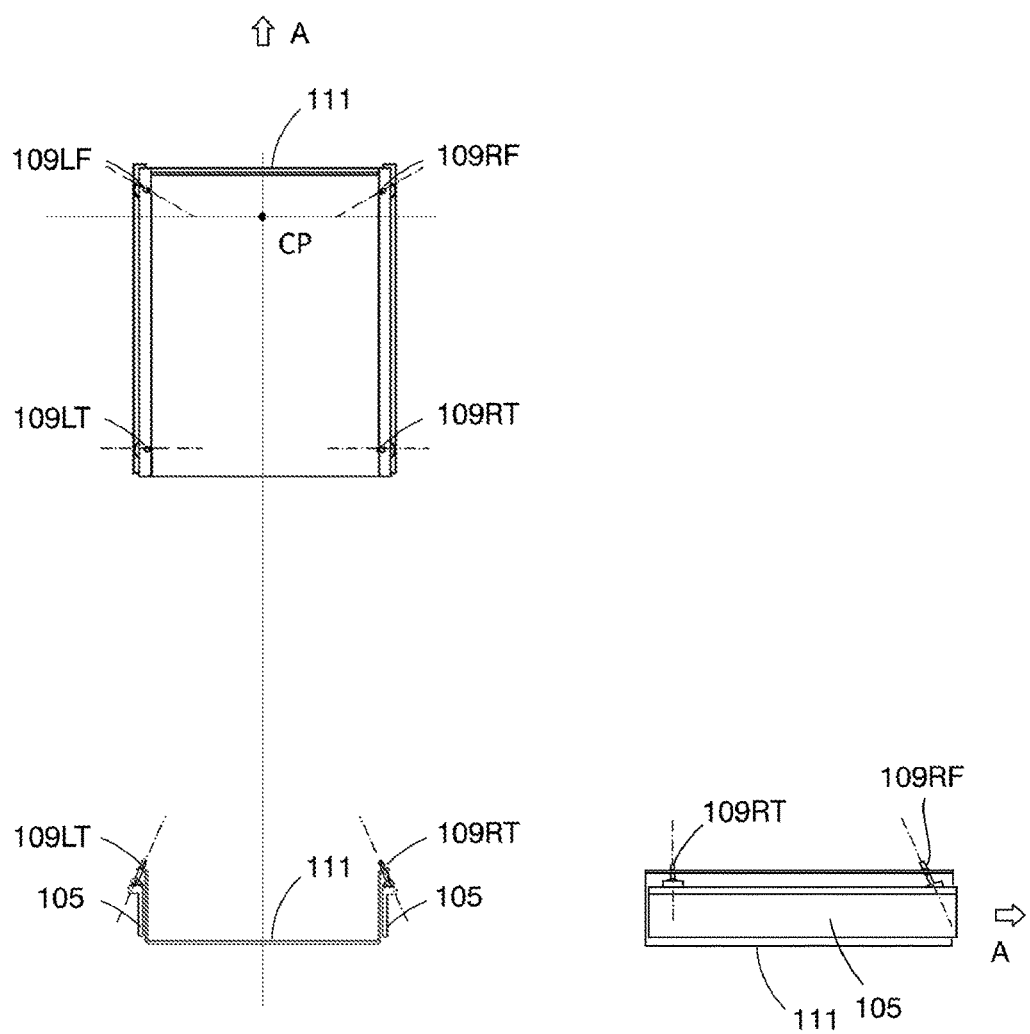
FIG. 14 is an explanatory view of an aspect in which the front damper is also inclined relative to the direction of travel as still another modification of the arrangement of the dampers illustrated in FIG. 10B (sixth embodiment)

FIG. 14 is an explanatory view illustrating an aspect in which the front dampers 109LF and 109RF are inclined also relative to the direction of travel.

According to this configuration, when the vehicle that is moving forward decelerates by a brake, vibration caused by force exerted to push the battery 40 forward upon the deceleration can effectively be relaxed. To effectively relax the force for pushing the battery 40 forward, the front dampers 109LF and 109RF are disposed as being inclined.

Figure 15:
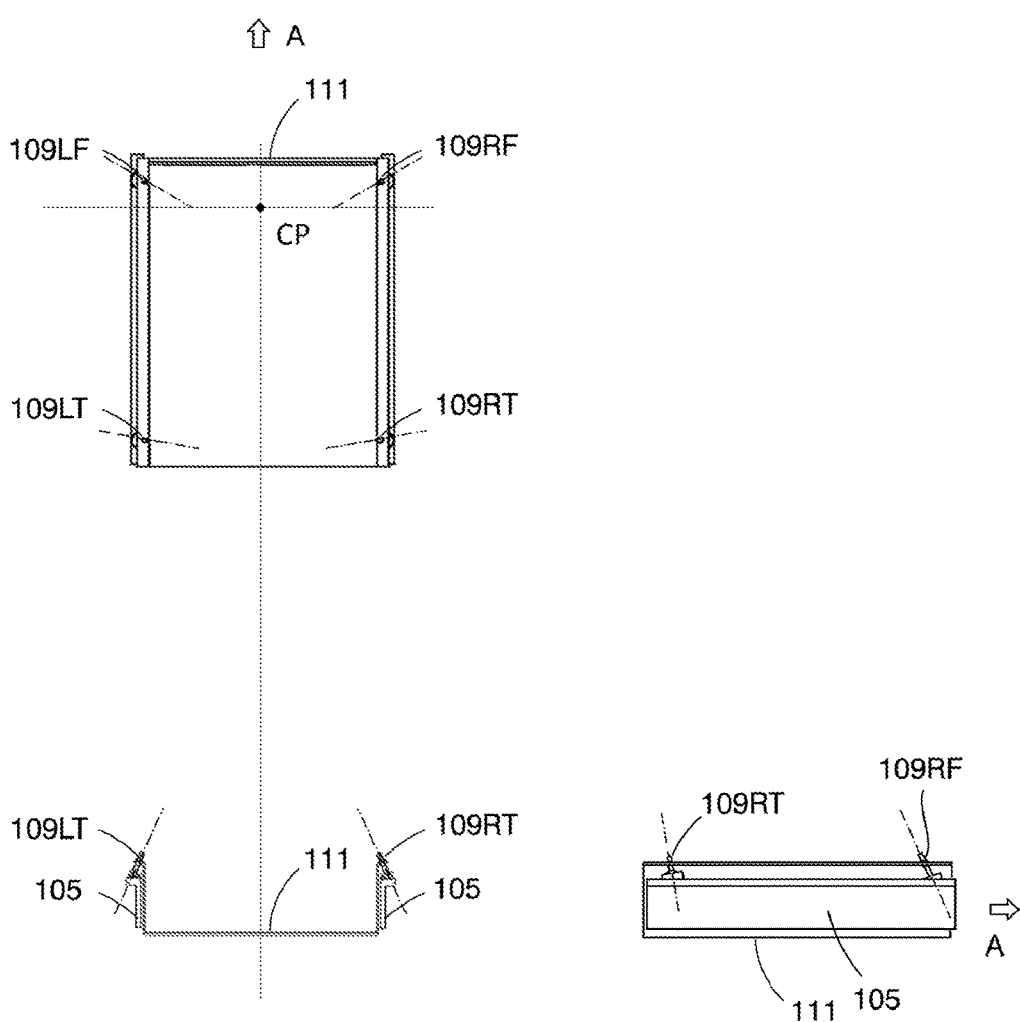
FIG. 15 is an explanatory view of an aspect in which the front and rear dampers are inclined in a same direction relative to the direction of travel as a modification of the arrangement of the dampers illustrated in FIG. 13 (sixth embodiment)

FIG. 15 is an explanatory view of an aspect in which the front and rear dampers 109LF and 109LT and the front and rear dampers 109RF and 109RT are inclined in a same direction with respect to the direction of travel. Besides the front dampers 109LF and 109RF being inclined as illustrated in FIG. 14, the front and rear dampers 109LF, 109RF, 109LT, and 109RT are inclined with respect to the vertical direction as illustrated in FIG. 15. With this configuration, vibration in the direction of travel caused upon deceleration can be dispersively relaxed by the front and rear dampers.

In this case, the front dampers 109LF and 109RF may be more greatly inclined than the rear dampers 109LT and 109RT with respect to the vertical direction. When a brake is applied, larger force is applied to the front dampers 109LF and 109RF than to the rear dampers 109LT and 109RT. Therefore, vibration can effectively be relaxed by disposing the front dampers as being more greatly inclined.

In FIGS. 14 and 15, upper portions of the Z axes of the dampers 109LF and 109RF are inclined in a direction opposite to the direction indicated by the arrow A. However, an aspect is also considered in which they are inclined in a direction same as the direction of the arrow A. According to this configuration, vibration caused when the vehicle accelerates in the direction of the arrow A or when the vehicle moving in the opposite direction of the arrow A decelerates can effectively be relaxed. In this case, it is preferable that: the Z axes of the dampers 109LF and 109RF are disposed along the vertical direction and upper portions of the Z axes of the dampers 109LT and 109RT are inclined in the direction of the arrow A; or upper portions of the Z axes of the dampers 109LF, 109RF, 109LT, and 109RT are inclined in the direction of the arrow A in such a way that the inclination degree of the dampers 109LT and 109RT is larger than the inclination degree of the dampers 109LF and 109RF. According to these configurations, vibration can effectively be relaxed.

Seventh Embodiment

In FIG. 14, the front dampers 109LF and 109RF and the rear dampers 109LT and 109RT are inclined in the direction of the arrow A. However, the front and rear dampers may be inclined in opposite directions.

Figure 16:
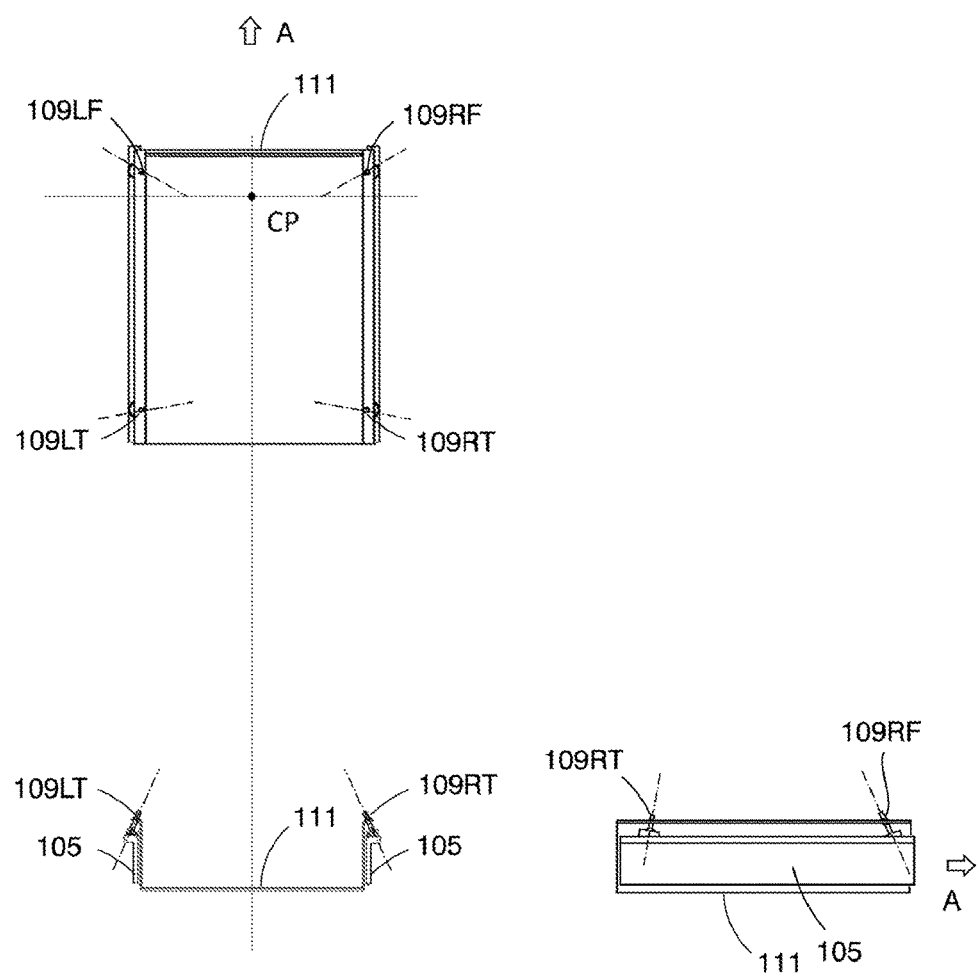
FIG. 16 is an explanatory view of an aspect in which front and rear dampers are inclined in opposite directions relative to the direction of travel as a modification of the arrangement of the dampers illustrated in FIG. 14 (seventh embodiment)

FIG. 16 is an explanatory view of an aspect in which the front and rear dampers are inclined in opposite directions with respect to the direction of travel. According to this configuration, vibration caused by deceleration can effectively be relaxed when a brake is applied during a backward movement as well as when a brake is applied during a forward movement.

In this case, it is preferable that the front dampers 109LF and 109RF are more greatly inclined than the rear dampers 109LT and 109RT with respect to the vertical direction. In general, a speed of the vehicle moving forward is larger than a speed of the vehicle moving backward, and thus, vibration upon braking is larger while the vehicle is moving forward. In view of this, the front dampers that relax vibration caused by braking during a forward movement are disposed as being more greatly inclined than the rear dampers.

While, in FIG. 16, the front and rear dampers 109LF and 109LT and the front and rear dampers 109RF and 109RT in the direction of travel are inclined so that the Z axes intersect each other on a higher position on the Z axes, they may be disposed as being inclined so that the Z axes intersect each other on a lower position on the Z axes.

Eighth Embodiment

In the first to seventh embodiments, various aspects in which dampers are disposed as being inclined with respect to the vertical direction have been described. In the present embodiment, dampers may be disposed as being inclined with respect to the vertical direction as in the first to seventh embodiments. However, the dampers are not limited thereto, and may be disposed along the vertical direction.

Figure 17:
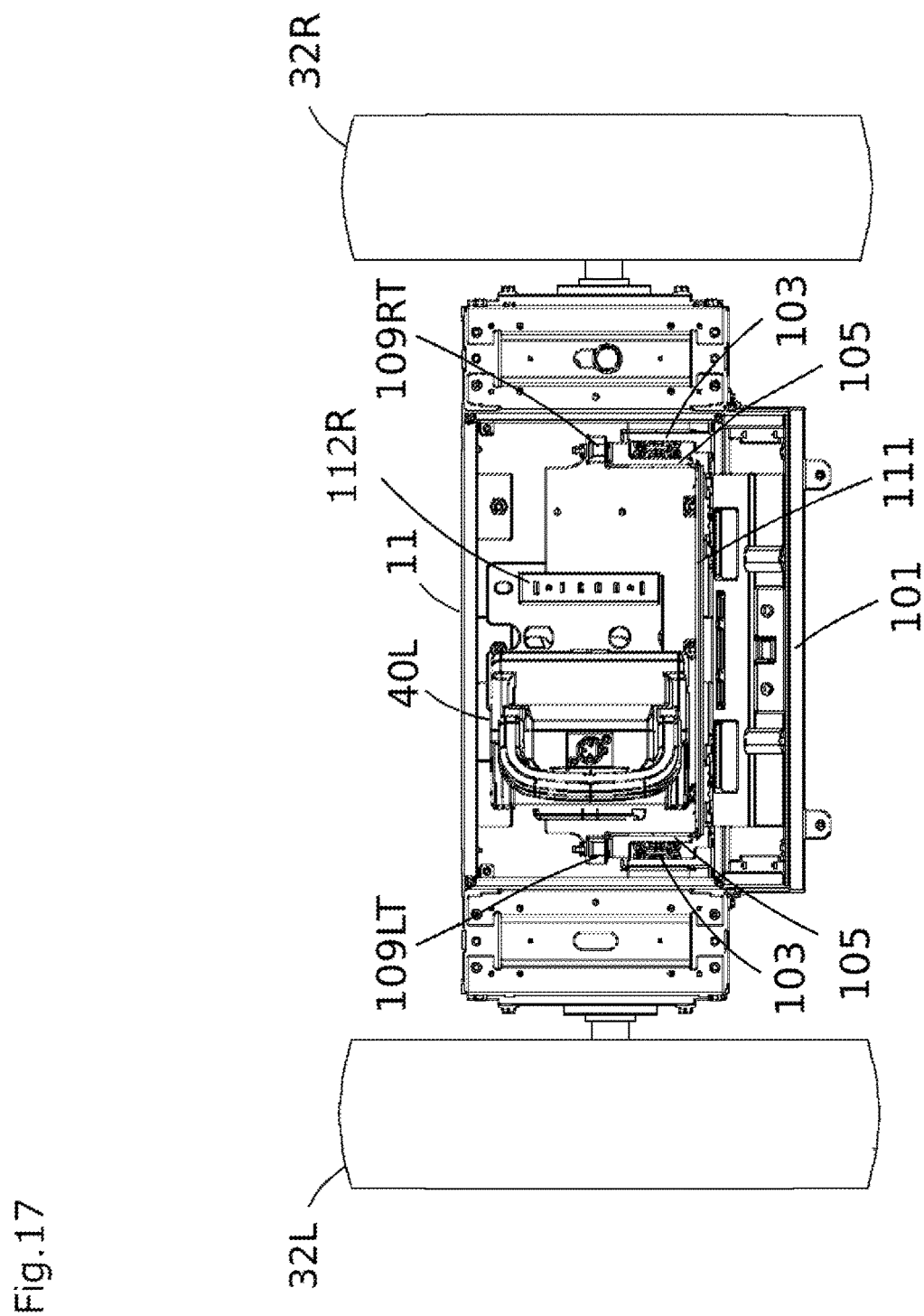
FIG. 17 is a back view, corresponding to FIG. 5, of an autonomous vehicle according to the present embodiment (eighth embodiment)

FIG. 17 is a back view, corresponding to FIG. 5, of an autonomous vehicle according to the present embodiment. Different from FIG. 5, FIG. 17 illustrates an aspect in which the dampers 109LT and 109RT are disposed along the vertical direction.

A battery supporting member 111 has mounted thereon two batteries, a left battery and a right battery. FIG. 17 illustrates that only a left battery 40L is mounted. A power supply receptor 112R on the inner side of the chassis body 11 is disposed on a region where a right battery 40R (not illustrated in FIG. 17) is to be mounted.

The power supply receptor 112R is engaged with a power supply connector mounted on the battery 40R to receive electric power supplied to the vehicle body from the battery 40R.

That is, the battery 40R not illustrated in FIG. 17 has a power supply connector on the leading end facing the power supply receptor 112R. When the battery 40R is mounted to the right part of the battery supporting member 111 to be inserted into the chassis body 11, the power supply connector on the leading end of the battery 40R is engaged with the power supply receptor 112R, so that electric power is supplied to the vehicle body.

Similarly, the left battery 40L has a power supply connector on the leading end in the insertion direction. A power supply receptor (not illustrated in FIG. 17) that is engaged with the power supply connector on the battery 40L is mounted on the chassis body 11.

Figure 18:
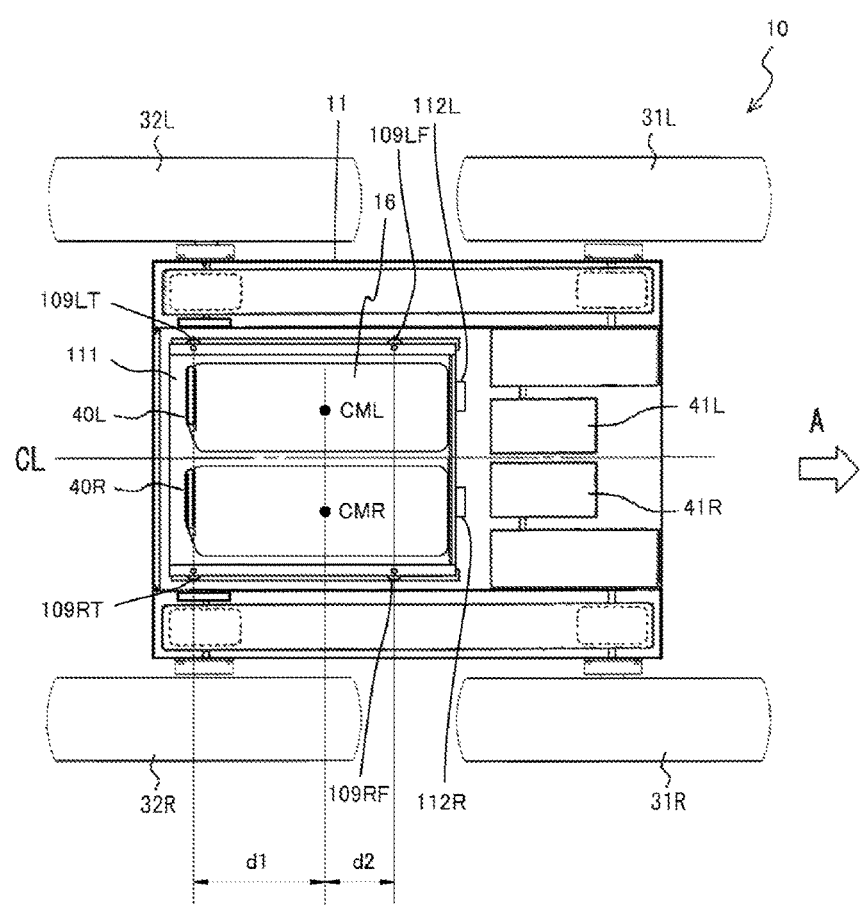
FIG. 18 is a plan view illustrating a chassis body of the autonomous vehicle according to the present embodiment (eighth embodiment)

FIG. 18 is a plan view, corresponding to FIG. 4 in the first embodiment, illustrating the chassis body 11 of the autonomous vehicle according to the present embodiment. FIG. 18 illustrates characteristic arrangement of the dampers 109LF, 109RT, 109LF, and 109RF in this embodiment.

In FIG. 18, a center of gravity position of the left battery 40L is indicated as CML, and a center of gravity position of the right battery 40R is indicated as CMR. The center of gravity position of the battery 40L and the center of gravity position of the battery 40R are the same in an insertion-and-extraction direction, that is, in the lateral direction along the sheet surface in FIG. 18, and are different from each other in the vertical direction along the sheet surface and perpendicular to the insertion-and-extraction direction.

In the insertion-and-extraction direction, a distance between the center of gravity positions CML and CMR of the batteries 40L and 40R and the dampers 109LT and 109RT which are on the rear side, that is, provided in a direction in which the battery supporting member 111 is extracted in FIG. 18, is indicated by d1. In addition, a distance between the center of gravity positions CML and CMR and the dampers 109LF and 109RF which are on the front side, that is, provided in a direction in which the battery supporting member 111 is inserted, is indicated by d2.

As illustrated in FIG. 18, in the insertion-and-extraction direction, the dampers are respectively disposed on the insertion side and the extraction side across the center of gravity positions CML and CMR in a state in which the batteries 40L and 40R are inserted into the chassis body 11. The respective dampers are disposed such that the relationship of d1>d2 is established. Specifically, the respective dampers are disposed such that, in the insertion-and-extraction direction, the dampers 109LF and 109RF are closer to the center of gravity positions CML and CMR than the dampers 109LT and 109RT. That is to say, the dampers close to the power supply connectors are disposed as close to the centers of gravity of the batteries as possible.

When the batteries 40L and 40R are mounted on the battery supporting member 111, and inserted into the chassis body 11, the power supply connectors (not illustrated in FIG. 18) provided on the batteries 40L and 40R are engaged with the power supply receptors 112L and 112R on the chassis body.

As a different aspect, it is considered that the power supply receptors are disposed on the battery chamber cover 101. In this case, the power supply connectors of the batteries 40L and 40R are mounted on the leading ends in a drawing direction. In this aspect, when the batteries 40L and 40R are inserted into the chassis body 11 and the battery chamber cover 101 is closed, the power supply connectors and the power supply receptors are engaged with each other.

Figure 19:
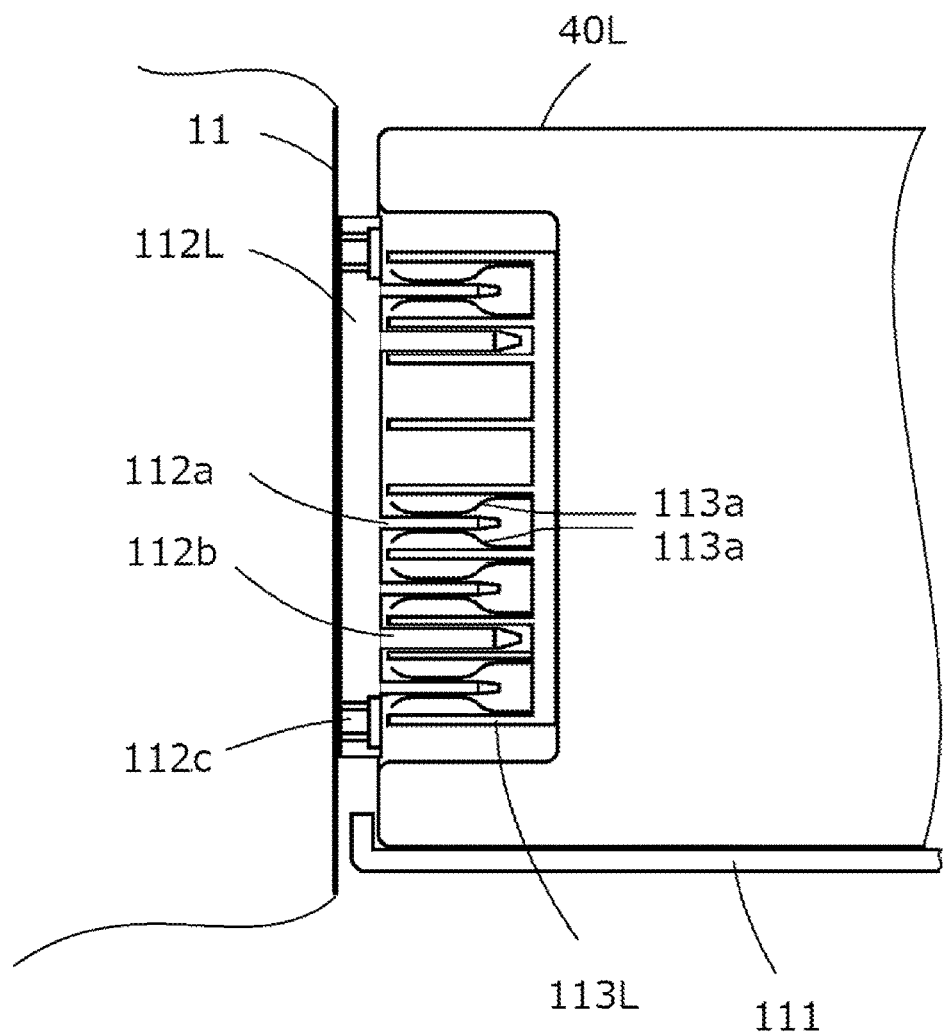
FIG. 19 is a vertical sectional view in the vicinity of a power supply connector and a power supply receptor in FIG. 18 (eighth embodiment).

FIG. 19 is a vertical sectional view illustrating that the power supply connector 113L on the battery 40L and the power supply receptor 112L illustrated in FIG. 18 are engaged with each other. As illustrated in FIG. 19, the power supply receptor 112L has six bar-like connector pins 112a and two guide pins 112b which are vertically arranged, and is attached to the chassis body 11 with screws 112c so as to be movable within a predetermined range. That is, a screw hole on a base part of the power supply connector 112L has an inner diameter larger than the outer diameter of the screw 112c, and the power supply connector 112L freely moves within a range of the dimensional difference between the inner diameter and the outer diameter.

The guide pin 112b has a tapered tip. When the battery 40L is inserted and the power supply receptor 112L is engaged with the power supply connector 113L, smooth insertion is achieved and the power supply connector 113L and the power supply receptor 112L are engaged with each other, even if there is a slight positional deviation between the power supply connector 113L and the power supply receptor 112L.

A recessed section is formed on the leading end of the battery 40L in the insertion direction, and the power supply connector 113L is disposed in the recessed section. The power supply connector 113L is provided with a pair of connector pins 113a corresponding to the connector pin 112a in the power supply receptor 112L. The connector pins 113a have elasticity, and due to the elasticity, the connector pins 113a hold the connector pin 112a on the power supply receptor 112L to be in contact therewith. A pair of connector pins 113a having elasticity is separated from the adjacent pair of connector pins 113a across a wall so as not to be in contact with the adjacent pair of connector pins due to deformation.

The dampers are disposed to relax vibration being transmitted to the battery from the chassis body 11. When the dampers relax vibration, the battery is displaced with respect to the chassis body 11. When the battery vibrates due to the vibration of the chassis body 11, this vibration is absorbed by the dampers, and the battery is displaced with respect to the chassis body 11. Therefore, the power supply connector 113L on the battery engaged with the power supply receptor 112L on the chassis body 11 is about to be displaced within a range where the power supply receptor 112L is movable with respect to the chassis body 11. The power supply receptor 112L is attached to be movable within a predetermined range with respect to the chassis body 11. Further, the power supply receptor 112L and the power supply connector 113L are engaged with each other as being positioned by the guide pins 112b or a housing, and thus, the engagement between them is not released. However, when strong vibration exceeding the range where the power supply receptor 112L is displaceable is transmitted to the battery 40L from the chassis body 11, the displacement of the power supply connector 113L on the battery 40L is restricted, and the battery 40L vibrates vertically or horizontally about the portion of the power supply connector 113L as a supporting point. When strong vibration continues for a long time, the connector pins 113a on the power supply connector 113L on the battery 40L are gradually pushed out due to the vibration, which might lead to a poor contact between the connector pins 113a and the connector pin 112a on the power supply receptor 112L.

In the present embodiment, the dampers 109LF and 109RF close to the power supply connector 113L are disposed on positions close to the center of gravity of the battery, that is, on positions distant from the leading end having the power supply connector 113L. Therefore, vibration about the portion of the power supply connector 113L as a supporting point is effectively relaxed by not only the dampers 109LT and 109RT distant from the power supply connector but also the dampers 109LF and 109RF close to the power supply connector.

If the battery vibrates about the power supply connector 113L as a supporting point, the dampers 109LF and 109RF close to the power supply connector 113L have smaller displacement than the dampers 109LT and 109RT distant from the power supply connector 113L. However, even when the battery 40L sways about the power supply connector 113L as a supporting point by strong vibration exceeding the range where the power supply connector 113L engaged with the power supply receptor 112L is displaceable, as well as when the battery 40L sways by small vibration within the range where the power supply connector 113L is displaceable, the dampers 109LF and 109RF close to the power supply connector 113L act to relax the vibration.

The same is applied to vibration transmitted to the battery 40R.

The configuration in which the dampers are disposed in the insertion-and-extraction direction with respect to the center of gravity position of the battery as in the present embodiment can prevent a trouble of a contact failure between the connector pins 113a and the connector pin 112a on the power supply receptor 112L because of the connector pins 113a being pushed out.

Ninth Embodiment

The eighth embodiment describes the configuration for further decreasing force for displacing the portion of the power supply connector with respect to the chassis body 11 due to vibration of the vehicle body.

The present embodiment describes a method for further decreasing force for displacing the portion of the power supply connector with respect to the chassis body 11 by a different configuration.

In the present embodiment, dampers close to the power supply connector have a smaller deformation amount with respect to vibration than dampers distant from the power supply connector.

According to this configuration, the dampers distant from the power supply connector can be more greatly displaced than the dampers close to the power supply connector. Therefore, the displacement of the battery relative to the chassis body 11 on the portion of the power supply connector 11 is reduced more with the vibration of the entire battery being relaxed, whereby a contact failure of the power supply connector can be avoided.

Having smaller displacement relative to vibration means having smaller vibration absorption. That is, the dampers which are less displaced are hard dampers which is difficult to be displaced.

When this is applied to the configuration in FIG. 18, the dampers close to power supply connectors 113 in the insertion-and-extraction direction are the dampers 109LF and 109RF. On the contrary, the dampers distant from the power supply connectors 113 are dampers 109LT and 109RT. Therefore, dampers which have a property of being relatively soft to be able to sufficiently relax impact are used for the dampers 109LT and 109RT, and dampers which have a property of being harder are used for the dampers 109LF and 109RF. Note that each of the dampers may be disposed along the vertical direction or may be inclined with respect to the vertical direction.

The configuration in the present embodiment may be combined to the configuration described in the eighth embodiment.

Tenth Embodiment

The present embodiment describes a method for further reducing force for displacing the portion of the power supply connector relative to the chassis body 11 by a configuration different from the configurations in the eighth and ninth embodiments.

In the present embodiment, dampers close to the power supply connector have a smaller displaceable range than the dampers distant from the power supply connector.

According to this configuration, the dampers distant from the power supply connector can be more greatly displaced than the dampers close to the power supply connector, thereby being capable of sufficiently relaxing large impact. Accordingly, with the vibration of the entire battery being relaxed by the displacement of the dampers, the range where the battery is displaceable relative to the chassis body 11 is decreased on the portion of the power supply connector, and large vibration is relaxed by the dampers distant from the power supply connector, whereby a contact failure of the power supply connector can be avoided.

Having a smaller displaceable range relative to vibration means that the magnitude of vibration which can be absorbed is smaller.

When this is applied to the configuration in FIG. 18, the dampers close to power supply connectors 113 in the insertion-and-extraction direction are the dampers 109LF and 109RF. On the contrary, the dampers distant from the power supply connectors 113 are dampers 109LT and 109RT. Therefore, dampers which have a property of being displaceable within a large range are used for the dampers 109LT and 109RT so that large vibration can be relaxed. Dampers which have a property of being displaceable within a small range are used for the dampers 109LF and 109RF.

Note that each of the dampers may be disposed along the vertical direction or may be inclined with respect to the vertical direction.

The configuration in the present embodiment may be combined to one or both of the configurations described in the eighth and ninth embodiments.

As described above,
(i) the batter-driven traveling device according to the present invention includes: a framework section disposed on at least a bottom part of a vehicle body for ensuring strength of the vehicle body; two slide rails being composed of a left slide rail and a right slide rail and being supported by the framework section and extending substantially horizontally; a battery supporting member that is mounted to be insertable into the vehicle body and extractable from the vehicle body by using the two slide rails; and a plurality of dampers disposed on a path through which vibration of the vehicle body is transmitted from each of the slide rails to the battery supporting member for relaxing the vibration transmitted from the vehicle body to the battery while the device travels, wherein the left slide rail is disposed on left side of the battery supporting member and the right slide rail is disposed on right side of the battery supporting member, and each of the dampers is disposed above or below the left slide rail or the right slide rail.

In the present invention, the framework section corresponds to a chassis or a frame, for example. However, it is not limited thereto, because there are a variety of structures for ensuring strength of a vehicle body.

In addition, the slide rail is a mechanism for drawing the battery supporting member, and may be a general-purpose slide rail or an exclusively designed slide rail. A mechanism of any types, such as a roller type, a bearing type, or a type of simply sliding a member, can be used for a mechanism for sliding the battery supporting member.

Each of the dampers may be configured by a rubber material, a urethane elastomer, a metal spring, an air spring, etc., and a combination thereof.

Furthermore, the battery supporting member may have any shape so long as it supports the battery. Specific examples of the battery supporting member include a box-type member storing a battery and a tray-type member. However, it is not limited thereto.

In addition, the dampers relax vibration transmitted to the battery from a chassis, and has a characteristic such that a spring constant in one direction (Z direction) out of X, Y, and Z directions which are three-dimensionally orthogonal is larger than those in other directions (X and Y directions). One characteristic aspect of the present invention relates to the arrangement of the dampers.

When the dampers are inclined in a symmetrical manner, it is preferable that they have a same inclination angle in a strict sense. However, they may not have a same inclination angle. A scope of the meaning of "symmetrical" herein is wide. It is only necessary that the Z directions of the left and right dampers are not along a vertical direction, and not inclined in a same direction relative to the vertical direction.

Each of the dampers is disposed above or below each of the left and right slide rails. In this case, it is only necessary that a position where each damper is disposed partly overlaps the position of the slide rail, and it is unnecessary that the position where each damper is disposed entirely overlaps the position of the slide rail.

Still preferable aspects of the present invention will be described.

(ii) Each of the dampers may be configured such that a spring constant in a Z direction out of X, Y, and Z directions which are three-dimensionally orthogonal is larger than those in the X and Y directions, and the dampers on left and right sides are disposed in such a way that, in a plane perpendicular to an insertion-and-extraction direction of the battery supporting member, the Z directions of the dampers are inclined in a symmetrical manner relative to a vertical direction.

According to this configuration, vibration in a vertical direction and in a lateral direction is effectively absorbed, whereby vibration to the battery can be relaxed.

(iii) Each of the dampers may be disposed above the left slide rail or the right slide rail.

According to this configuration, a damper mechanism has a compact structure integral with a battery drawing mechanism. Thus, a traveling device having a low center of gravity and relaxing vibration of the battery by effectively absorbing vibration of the vehicle body in various directions can be implemented.

(iv) The battery supporting member may be disposed on the bottom part of the vehicle body for supporting the battery, and the battery may be replaceable.

According to this configuration, a traveling device having a low center of gravity and facilitating battery replacement can be implemented.

(v) Each of the dampers may be disposed in a path through which vibration of the vehicle body is transmitted from the framework section to the respective slide rails, instead of in the path through which vibration of the vehicle body is transmitted from each of the slide rails to the battery supporting member.

According to this configuration as well, a damper mechanism has a compact structure integral with a battery drawing mechanism. Thus, a traveling device having a low center of gravity and relaxing vibration of the battery by effectively absorbing vibration of the vehicle body in various directions can be implemented.

(vi) The dampers may be composed of at least two dampers which are disposed in the insertion-and-extraction direction such that an inclination degree of a Z direction relative to the vertical direction is increased toward a damper distant from a turning center when the vehicle body turns.

The larger a turning radius is, the larger force is applied at the start and stop of the turn. This configuration enables leveling in relaxation of vibration in turning.

(vii) The dampers may be composed of at least two dampers which are disposed in the insertion-and-extraction direction of the battery supporting member such that a Z direction of at least one of the two dampers is inclined relative to the vertical direction in a plane parallel to the insertion-and-extraction direction.

According to this configuration, vibration in a front-rear direction applied to the battery upon acceleration or deceleration can also be effectively relaxed.

(viii) The two dampers may be disposed such that the Z directions of the two dampers are inclined in a same direction or in opposite directions in the plane parallel to the insertion-and-extraction direction.

According to this configuration, if the dampers are inclined in a same direction, vibration in a front-rear direction applied to the battery upon deceleration can effectively be relaxed, for example. If the dampers are inclined in opposite directions, vibration in a front-rear direction applied to the battery upon acceleration and deceleration can effectively be relaxed.

(ix) The two dampers may be disposed such that the rear one of the two dampers is more greatly inclined than the front one in the plane parallel to the insertion-and-extraction direction.

According to this configuration, when a brake is applied to reduce a speed while the device is moving forward, vibration caused by force for pushing out the battery forward can effectively be relaxed.

Preferable aspects of the present invention include an aspect obtained by combining any of the aspects described above.

(x) The traveling device may further include: a pair of left and right side plates including a side surface section located on the side of each slide rail along the insertion-and-extraction direction, and an upper surface section that is substantially horizontally flat, wherein the dampers may be disposed between the upper surface sections of the side plates and the battery supporting member.

According to this configuration, each of the dampers is disposed on an upper surface of each of the side plates, and thus, each of the dampers can relax vibration from the vehicle body, while receiving the weight of the battery and the battery supporting member.

The inverted L-shaped side plate in the embodiments corresponds to the side plate. In the aspect illustrated in FIG. 5, a side surface section of the side plate is located between each of the left and right slide rails and the battery supporting member, that is, on the inner side of each of the left and right slide rails. As a different aspect, the side surface section may be located on the outside of each of the left and right slide rails. In addition, the side plate is not necessarily formed into an inverted L shape, and may be a flat plate member with a thickness for forming an upper surface section.

(xi) The battery may have a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, and the dampers may be disposed on each the insertion side and the extraction side in the insertion-and-extraction direction across a center of gravity of the battery in a state where the battery is inserted into the framework section, the damper close to the power supply connector being disposed closer to the center of gravity than the damper distant from the power supply connector.

Vibration transmitted from the vehicle body to the battery is relaxed by deformation of the dampers. According to the configuration described above, the dampers close to the power supply connector are located closer to the center of gravity of the battery than the dampers distant from the power supply connector. Therefore, even if the battery vibrates about the power supply connector as a supporting point due to strong vibration, the vibration of the battery can effectively be relaxed. This reduces stress applied to terminals of the power supply connector engaged with the vehicle body due to the vibration from the vehicle body. In addition, this configuration can prevent an occurrence of a contact failure due to deformation of the terminals by vibration.

(xii) The battery may have a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, the dampers may be disposed on each the insertion side and the extraction side in the insertion-and-extraction direction across a center of gravity of the battery in a state where the battery is inserted into the framework section, the dampers may absorb vibration by being deformed, and the damper close to the power supply connector may have a property of having a smaller deformation amount with respect to vibration than the damper distant from the power supply connector.

Vibration transmitted from the vehicle body to the battery is relaxed by deformation of the dampers. According to the configuration described above, the deformation of the damper close to the power supply connector engaged with the vehicle body becomes smaller than the deformation of the damper distant from the power supply connector, whereby stress applied to terminals of the power supply connector due to deformation is decreased. In addition, this configuration can prevent an occurrence of a contact failure due to deformation of the terminals by vibration.

(xiii) The battery may have a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, the dampers may be disposed on each the insertion side and the extraction side in the insertion-and-extraction direction across a center of gravity of the battery in a state where the battery is inserted into the framework section, the dampers may absorb vibration by being deformed, and the damper close to the power supply connector may have a property of having a smaller deformable range with respect to vibration than the damper distant from the power supply connector.

Vibration transmitted from the vehicle body to the battery is relaxed by deformation of the dampers. According to the configuration described above, the range where the damper close to the power supply connector engaged with the vehicle body is deformable becomes smaller than the range where the damper distant from the power supply connector is deformable, whereby stress applied to terminals of the power supply connector due to deformation is decreased. In addition, this configuration can prevent an occurrence of a contact failure due to deformation of the terminals by vibration.

Various modifications are possible for the present invention, in addition to the above-mentioned embodiment. Such modifications should not be deemed to be out of the scope of the present invention. The present invention should include all the modifications within the scope of the claims, their equivalents, and within the above scope.

What is claimed is:

1. A battery-driven traveling device comprising:
   a framework section disposed on at least a bottom part of a vehicle body for ensuring strength of the vehicle body;
   two slide rails being composed of a left slide rail and a right slide rail and being supported by the framework section and extending substantially horizontally;
   a battery supporting member that is mounted to be insertable into the vehicle body and extractable from the vehicle body by using the two slide rails; and
   a plurality of dampers are non-rotatably disposed on a path through which vibration of the vehicle body is transmitted from each of the slide rails to the battery supporting member for relaxing the vibration transmitted from the vehicle body to the battery while the device travels, wherein
   the left slide rail is disposed on a left side of the battery supporting member and the right slide rail is disposed on a right side of the battery supporting member, and each of the dampers is disposed above or below the left slide rail or the right slide rail, wherein each of the dampers has an end that is attached to a portion of the respective left slide rail or right slide rail.

2. The battery-driven traveling device according to claim 1, wherein
   each of the dampers is configured such that a spring constant in a Z direction out of X, Y, and Z directions which are three-dimensionally orthogonal is larger than those in the X and Y directions, and the dampers on left and right sides are disposed in such a way that, in a plane perpendicular to an insertion-and-extraction direction of the battery supporting member, the Z directions of the dampers are inclined in a symmetrical manner relative to a vertical direction.

3. The traveling device according to claim 1, wherein each of the dampers is disposed above the left slide rail or the right slide rail.

4. The traveling device according to claim 1, wherein
   the battery supporting member is disposed on the bottom part of the vehicle body for supporting the battery, and the battery is replaceable.

5. The traveling device according to claim 2, wherein
   the dampers are composed of at least two dampers which are disposed in the insertion-and-extraction direction such that an inclination degree of a Z direction relative to the vertical direction is increased toward a damper distant from a turning center when the vehicle body turns.

6. The traveling device according to claim 2, wherein
   the dampers are composed of at least two dampers which are disposed in the insertion-and-extraction direction of the battery supporting member such that a Z direction of at least one of the two dampers is inclined relative to the vertical direction in a plane parallel to the insertion-and-extraction direction.

7. The traveling device according to claim 6, wherein
   the two dampers are disposed such that the Z directions of the two dampers are inclined in a same direction or in opposite directions in the plane parallel to the insertion-and-extraction direction.

8. The traveling device according to claim 7, wherein
   the two dampers are disposed such that the rear one of the two dampers is more greatly inclined than the front one in the plane parallel to the insertion-and-extraction direction.

9. The traveling device according to claim 1, further comprising:
   a pair of left and right side plates including a side surface section located on the side of each slide rail along the insertion-and-extraction direction, and an upper surface section that is substantially horizontally flat, wherein
   the dampers are disposed between the upper surface sections of the side plates and the battery supporting member.

10. The traveling device according to claim 1, wherein
    the battery has a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, and the dampers are disposed on each the insertion side and the extraction side in the insertion-and-extraction direction across a center of gravity of the battery in a state where the battery is inserted into the framework section, the damper close to the power supply connector being disposed closer to the center of gravity than the damper distant from the power supply connector.

11. The traveling device according to claim 1, wherein the battery has a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, the dampers are disposed on each the insertion side and the extraction side in the insertion-and-extraction direction across a center of gravity of the battery in a state where the battery is inserted into the framework section, the dampers absorb vibration by being deformed, and the damper close to the power supply connector has a property of having a smaller deformation amount with respect to vibration than the damper distant from the power supply connector.

12. The traveling device according to claim 1, wherein the battery has a power supply connector that is engaged with a connector being disposed at the vehicle body side for supplying electric power to the vehicle body, the power supply connector being provided on a leading end of the battery on an insertion side in the insertion-and-extraction direction or on a leading end of the battery on an extraction side in the insertion-and-extraction direction, the dampers are disposed on each the insertion side and the extraction side in the insertion-and-extraction direction across a center of gravity of the battery in a state where the battery is inserted into the framework section, the dampers absorb vibration by being deformed, and the damper close to the power supply connector has a property of having a smaller deformable range with respect to vibration than the damper distant from the power supply connector.

* * * * *